United States Patent
Stern-Berkowitz et al.

(10) Patent No.: US 11,477,790 B2
(45) Date of Patent: Oct. 18, 2022

(54) TIMING ADVANCE AND PROCESSING CAPABILITIES IN A REDUCED LATENCY SYSTEM

(71) Applicant: INTERDIGITAL PATENT HOLDINGS, INC., Wilmington, DE (US)

(72) Inventors: Janet A. Stern-Berkowitz, Little Neck, NY (US); Moon-il Lee, Melville, NY (US)

(73) Assignee: InterDigital Patent Holdings, Wilmington, DE (US)

(*) Notice: Subject to any disclaimer, the term of this patent is extended or adjusted under 35 U.S.C. 154(b) by 0 days.

(21) Appl. No.: 16/324,321

(22) PCT Filed: Aug. 9, 2017

(86) PCT No.: PCT/US2017/046177
§ 371 (c)(1),
(2) Date: Feb. 8, 2019

(87) PCT Pub. No.: WO2018/031704
PCT Pub. Date: Feb. 15, 2018

(65) Prior Publication Data
US 2019/0191429 A1   Jun. 20, 2019

Related U.S. Application Data

(60) Provisional application No. 62/373,123, filed on Aug. 10, 2016.

(51) Int. Cl.
*H04W 72/04* (2009.01)
*H04W 56/00* (2009.01)
(Continued)

(52) U.S. Cl.
CPC ......... *H04W 72/048* (2013.01); *H04L 1/1887* (2013.01); *H04W 56/0045* (2013.01);
(Continued)

(58) Field of Classification Search
None
See application file for complete search history.

(56) References Cited

U.S. PATENT DOCUMENTS 7,714,778 B2 * 5/2010 Dupray ................. G01S 5/0278
342/357.31
9,131,498 B2   9/2015 Au et al.
(Continued)

FOREIGN PATENT DOCUMENTS

| CN | 102845111 A | 12/2012 |
| WO | 2015/139795 | 9/2015 |
| WO | 2016/040290 | 3/2016 |

OTHER PUBLICATIONS

Interdigital Communications, "On Processing Time Reduction for sTTI," 3GPP TSG RAN WG1 Meeting #86, R1-167657, Gothenburg, Sweden (Aug. 22-26, 2016).
(Continued)

*Primary Examiner* — Edan Orgad
*Assistant Examiner* — Emmanuel K Maglo
(74) *Attorney, Agent, or Firm* — Volpe Koenig

(57) ABSTRACT

A method and apparatus are described herein for handling reduced available processing time in systems configured to reduce latency such as systems using configurable transmission time intervals (TTIs) or short TTIs (sTTIs) and a processing capability (PC). A wireless transmit/receive unit (WTRU) may be configured to use a PC. The WTRU may receive a TTI configuration. The WTRU may determine the PC of the WTRU. The PC may be determined based on at least one of the TTI configuration and a processing criteria.
(Continued)

The WTRU may then transmit a report of the determined PC. The report may be transmitted to and eNB. The PC may be a timeline, and the timeline may be reported as a number of time units, wherein a time unit is at least one of a symbol, a TTI, a time sample, and a set of time samples.

22 Claims, 12 Drawing Sheets

(51) Int. Cl.
   *H04L 1/18* (2006.01)
   *H04W 72/08* (2009.01)
(52) U.S. Cl.
   CPC ... *H04W 72/0413* (2013.01); *H04W 72/0446* (2013.01); *H04W 72/085* (2013.01); *H04W 56/0015* (2013.01)

(56) References Cited

U.S. PATENT DOCUMENTS

| | | | |
|---|---|---|---|
| 9,538,546 B2 | 1/2017 | Sachs et al. | |
| 9,907,102 B2* | 2/2018 | Wang | H04W 74/002 |
| 10,484,997 B2 | 11/2019 | Zhang et al. | |
| 10,548,118 B2* | 1/2020 | Patel | H04L 5/0044 |
| 10,757,727 B2* | 8/2020 | Yang | H04W 72/1289 |
| 2008/0070556 A1* | 3/2008 | Bhattacharjee | H04W 72/005 455/414.1 |
| 2010/0067589 A1* | 3/2010 | Schumacher | H04L 5/0007 370/329 |
| 2012/0063390 A1 | 3/2012 | Yu et al. | |
| 2012/0093098 A1* | 4/2012 | Charbit | H04W 88/08 370/329 |
| 2013/0039232 A1* | 2/2013 | Kim | H04L 43/06 370/280 |
| 2013/0301608 A1* | 11/2013 | Frenne | H04W 74/004 370/328 |
| 2013/0336294 A1* | 12/2013 | Dinan | H04W 52/0216 370/336 |
| 2014/0133367 A1* | 5/2014 | Chen | H04L 5/16 370/279 |
| 2014/0198680 A1* | 7/2014 | Siomina | H04L 5/14 370/252 |
| 2014/0213237 A1* | 7/2014 | Yang | H04L 67/34 455/418 |
| 2014/0341145 A1* | 11/2014 | Nakashima | H04W 72/04 370/329 |
| 2015/0156750 A1* | 6/2015 | Quan | H04W 56/0045 370/329 |
| 2015/0237648 A1* | 8/2015 | Zhang | H04W 72/04 370/329 |
| 2015/0359029 A1 | 12/2015 | Seo et al. | |
| 2016/0057752 A1* | 2/2016 | Ahn | H04W 56/0005 370/329 |
| 2016/0150507 A1* | 5/2016 | Kim | H04W 72/005 455/450 |
| 2016/0219583 A1* | 7/2016 | Blankenship | H04W 72/1289 |
| 2016/0323070 A1* | 11/2016 | Chen | H04W 56/0045 |
| 2016/0345316 A1* | 11/2016 | Kazmi | H04W 56/0045 |
| 2017/0111160 A1* | 4/2017 | Chen | H04L 5/0048 |
| 2017/0164363 A1* | 6/2017 | Zhang | H04L 5/0055 |
| 2017/0222749 A1* | 8/2017 | Dinan | H04L 1/001 |
| 2017/0223670 A1* | 8/2017 | Chen | H04L 5/0048 |
| 2017/0289938 A1* | 10/2017 | Yoo | H04W 56/007 |
| 2017/0332354 A1* | 11/2017 | Chang | H04M 3/42289 |
| 2017/0332373 A1* | 11/2017 | Patel | H04L 5/1469 |
| 2018/0014301 A1* | 1/2018 | Chen | H04L 5/0048 |
| 2018/0227936 A1* | 8/2018 | Yerramalli | H04L 27/2662 |
| 2018/0324778 A1* | 11/2018 | Farajidana | H04L 5/0092 |
| 2018/0331808 A1* | 11/2018 | Li | H04L 1/1812 |
| 2018/0376498 A1* | 12/2018 | Bhattad | H04W 72/1294 |
| 2019/0215827 A1* | 7/2019 | Patel | H04L 5/14 |
| 2019/0239066 A1* | 8/2019 | Yi | H04L 1/1896 |
| 2019/0268128 A1* | 8/2019 | Zhou | H04L 1/1887 |
| 2019/0342864 A1* | 11/2019 | Hwang | H04L 5/0053 |
| 2020/0099475 A1* | 3/2020 | Amuru | H04L 1/1812 |

OTHER PUBLICATIONS

LG Electronics, "Processing time reduction for latency reduction," 3GPP TSG RAN WG1 Meeting #85, R1-165429, Nanjing, China (May 23-27, 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.6.0 (Jun. 2017).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.3.0 (Jun. 2017).
Third Generation Partnership Project, "Technical Specification Group Radio Access Network; Evolved Universal Terrestrial Radio Access (E-UTRA); Requirements for support of radio resource management (Release 14)," 3GPP TS 36.133 V14.0.0 (Jun. 2016).
Third Generation Partnership Project, "Technical Specification Group Radio Access Network; Evolved Universal Terrestrial Radio Access (E-UTRA); Requirements for support of radio resource management (Release 14)," 3GPP TS 36.133 V14.4.0 (Jun. 2017).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.6.1 (Jul. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.3.0 (Jun. 2017).
Third Generation Partnership Project, "Technical Specification Group Radio Access Network; Evolved Universal Terrestrial Radio Access (E-UTRA); Physical channels and modulation (Release 13)," 3GPP TS 36.211 V13.6.0 (Jun. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.3.0 (Jun. 2017).
Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.6.0 (Jun. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.3.0 (Jun. 2017).
Third Generation Partnership Project, "Technical Specification Group Radio Access Network; Evolved Universal Terrestrial Radio Access (E-UTRA); Physical layer; Measurements (Release 13)," 3GPP TS 36.214 V13.2.0 (Jun. 2016).
Third Generation Partnership Project, "Technical Specification Group Radio Access Network; Evolved Universal Terrestrial Radio Access (E-UTRA); Physical layer; Measurements (Release 13)," 3GPP TS 36.214 V13.4.0 (Dec. 2016).
Third Generation Partnership Project, "Technical Specification Group Radio Access Network; Evolved Universal Terrestrial Radio Access (E-UTRA); Physical layer; Measurements (Release 14)," 3GPP TS 36.214 V14.2.0 (Mar. 2017).

(56) References Cited

OTHER PUBLICATIONS

Third Generation Partnership Project, "Technical Specification Group Radio Access Network; Evolved Universal Terrestrial Radio Access (E-UTRA); User Equipment (UE) radio access capabilities (Release 13)," 3GPP TS 36.306 V13.2.0 (Jun. 2016).

Third Generation Partnership Project, "Technical Specification Group Radio Access Network; Evolved Universal Terrestrial Radio Access (E-UTRA); User Equipment (UE) radio access capabilities (Release 13)," 3GPP TS 36.306 V13.6.0 (Jun. 2017).

Third Generation Partnership Project, "Technical Specification Group Radio Access Network; Evolved Universal Terrestrial Radio Access (E-UTRA); User Equipment (UE) radio access capabilities (Release 14)," 3GPP TS 36.306 V14.3.0 (Jun. 2017).

Third Generation Partnership Project, "Technical Technical Specification Group Radio Access Network; Evolved Universal Terrestrial Radio Access (E-UTRA); Physical channels and modulation (Release 13)," 3GPP TS 36.211 V13.2.0 (Jun. 2016).

Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).

Third Generation Partnership Project, "Technical Specification Group Radio Access Network; Evolved Universal Terrestrial Radio Access (E-UTRA); Multiplexing and channel coding (Release 13)," 3GPP TS 36.212 V13.6.0 (Jun. 2017).

Third Generation Partnership Project, "Technical Specification Group Radio Access Network; Evolved Universal Terrestrial Radio Access (E-UTRA); Multiplexing and channel coding (Release 14)," 3GPP TS 36.212 V14.3.0 (Jun. 2017).

Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.8.0 (Jun. 2017).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0 (Jun. 2017).

\* cited by examiner

TIMING ADVANCE AND PROCESSING CAPABILITIES IN A REDUCED LATENCY SYSTEM

CROSS REFERENCE TO RELATED APPLICATIONS

This application is the U.S. National Stage, under 35 U.S.C. § 371, of International Application No. PCT/US2017/046177 filed Aug. 9, 2017, which claims the benefit of U.S. Provisional Application Ser. No. 62/373,123 filed Aug. 10, 2016, the contents of which is hereby incorporated by reference herein.

BACKGROUND

Emerging applications for cellular technology such as alarm reporting, automotive safety, factory process control, and machine type communications (MTC) may benefit from the utilization of low latency cellular communications. Low latency applications may find a 1 ms transmission time interval (TTI) and associated latencies that may, for example, be used in an LTE Advanced (LTE-A) system, insufficient. Existing applications such as gaming and real-time applications such as Voice Over LTE (VoLTE) and video telephony/conferencing, may also benefit from reduced latency in terms of, for example, increased perceived quality of experience. Some applications may use a short TTI (sTTI) in order to reduce latency; however, use of a sTTI reduces the available processing time.

SUMMARY

A method and apparatus are described herein for handling reduced available processing time in systems configured to reduce latency such as systems using configurable transmission time intervals (TTIs) or short TTIs (sTTIs).

A wireless transmit/receive unit (WTRU) may be configured to determine one or more processing capabilities, send a processing capability (PC) indication to an eNodeB (eNB) based on the determined processing capabilities, receive a PC configuration from the eNB, determine a maximum timing advance or maximum Rx-Tx time difference based on the PC configuration or the determined processing capabilities, and limit an applied timing advance or Rx-Tx time difference to the maximum timing advance or maximum Rx-Tx time difference for a specific TTI length. The WTRU may also be configured to measure a processing value (PV) of a processing parameter, determine the amount of headroom, which is the difference between the PV and the PC, and report the headroom based on a condition. The WTRU may also perform an action based on the condition.

In one example, the WTRU may be configured to use a PC. The WTRU may receive a TTI configuration. The WTRU may determine the PC of the WTRU. The PC may be determined based on at least one of the TTI configuration and a processing criteria. The WTRU may then transmit a report of the determined PC. The report may be transmitted to and eNB. The PC may be a timeline, and the timeline may be reported as a number of time units, wherein a time unit is at least one of a symbol, a TTI, a time sample, and a set of time samples.

In another example, a WTRU may be configured to use a configurable TTI. The WTRU may receive a TTI configuration. The WTRU may determine a PC of the WTRU for the TTI configuration based on a processing criteria. The WTRU may then transmit a report of the determined PC, and the determined PC may be based on a number of symbols in the TTI or TTI length that is used and/or configured. The WTRU may also determine a current processing value (PV). The report may be based on the satisfaction of a proximity condition, suspending one or more UL transmissions, or dropping a UL transmission. The processing criteria may include for example, a number of symbols in the TTI or TTI length that is used and/or configured.

In another example, a WTRU may be configured to use an sTTI. The WTRU may receive an sTTI configuration and determine a PC of the WTRU for the sTTI configuration based on a processing criteria. The WTRU may determine a current PV. The WTRU, based on the determined PC and the determined PV, may report a PC proximity based on the satisfaction of a proximity condition, suspending one or more UL transmissions, or dropping a UL transmission. In this example, processing criteria may include but are not limited to the following: sTTI length, timeline, transport block (TB) size, uplink (UL) channel type, time between an sTTI of the short physical downlink control channel (sPDCCH) and an sTTI of the UL.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
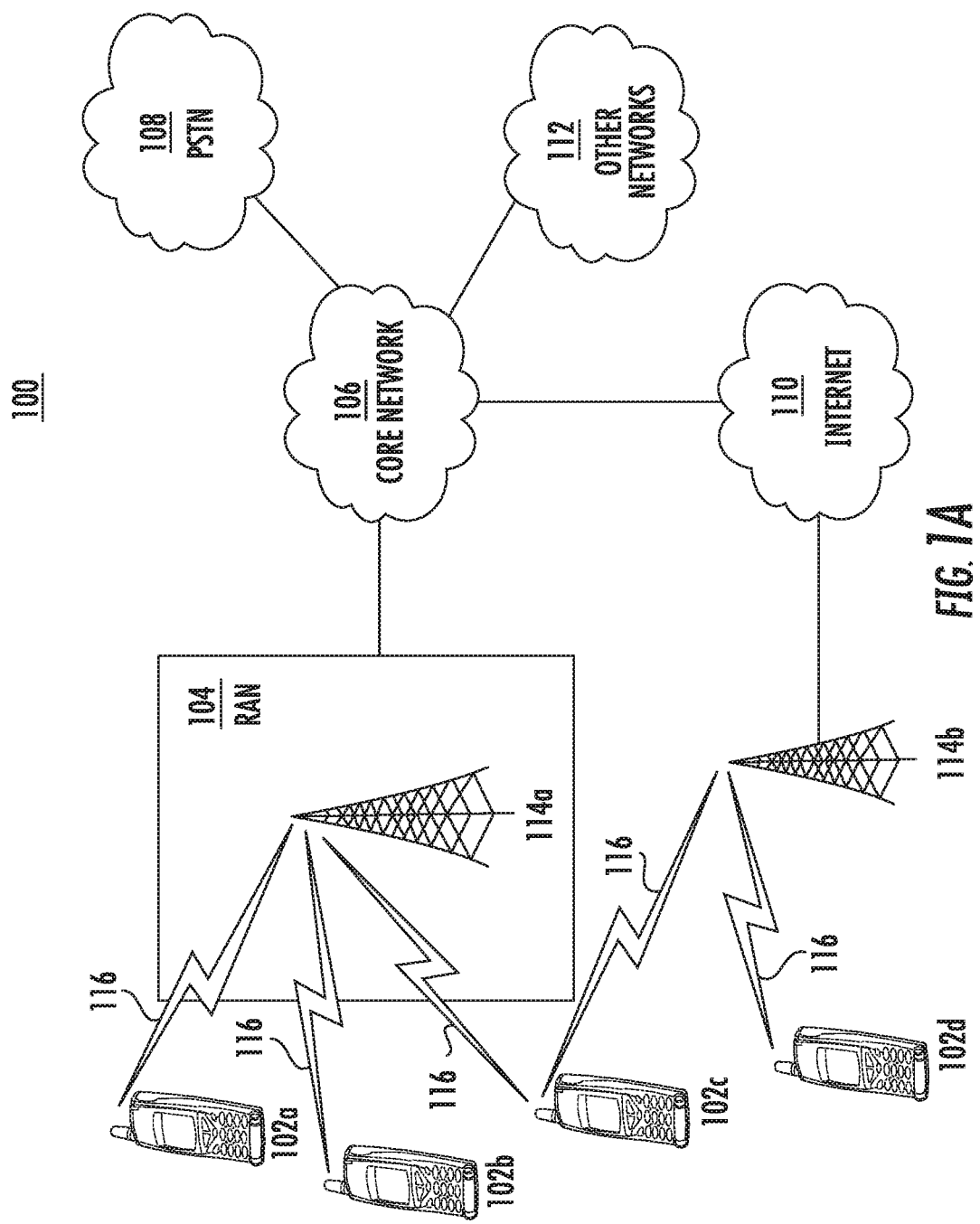
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HIVID), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a next generation NodeB (gNB), a new radio (NR) NodeB, a site controller, an access point (AP), a wireless router, a transmission/reception point (TRP), and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 Evolution Data Only/Evolution Data Optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers, transmitters, or receivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
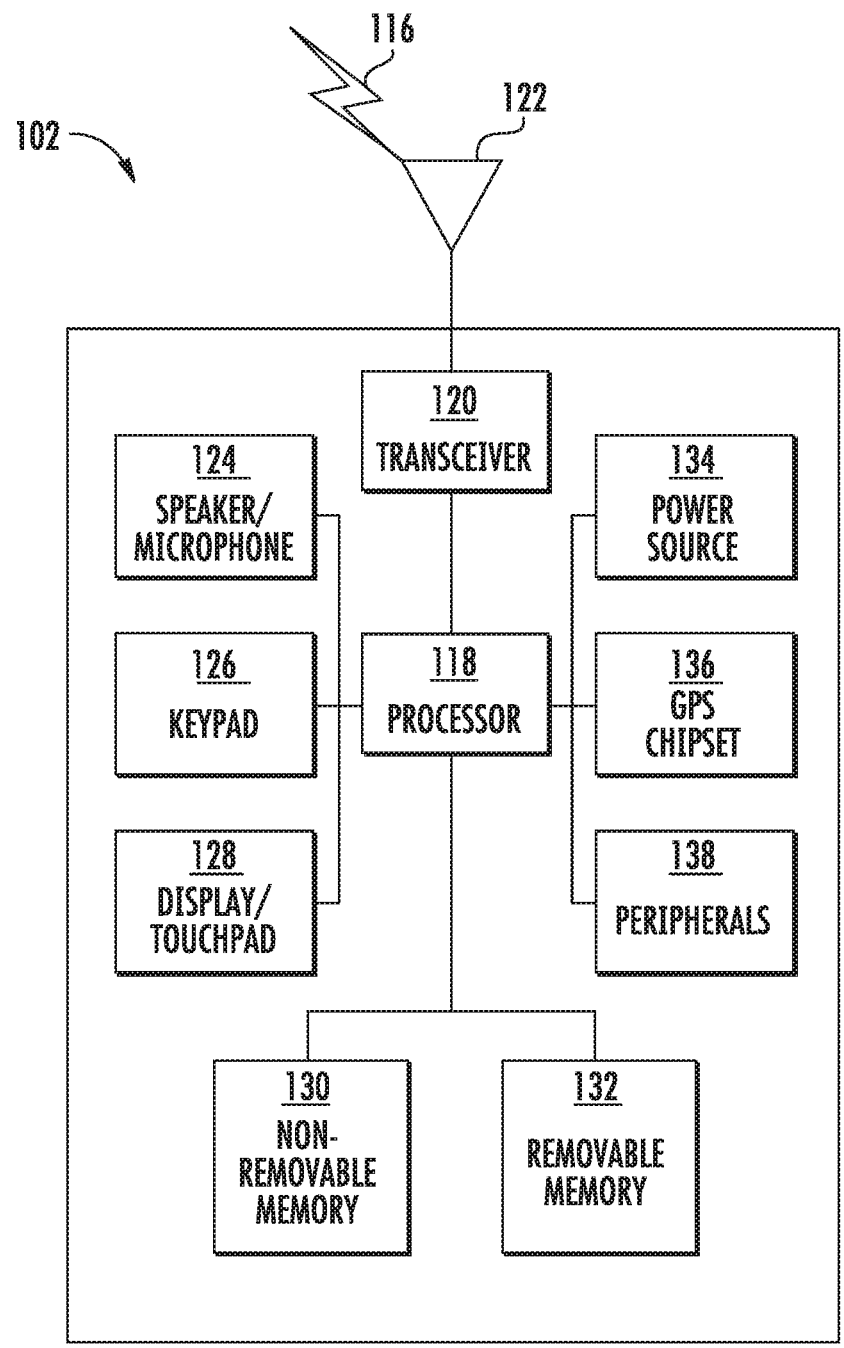
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
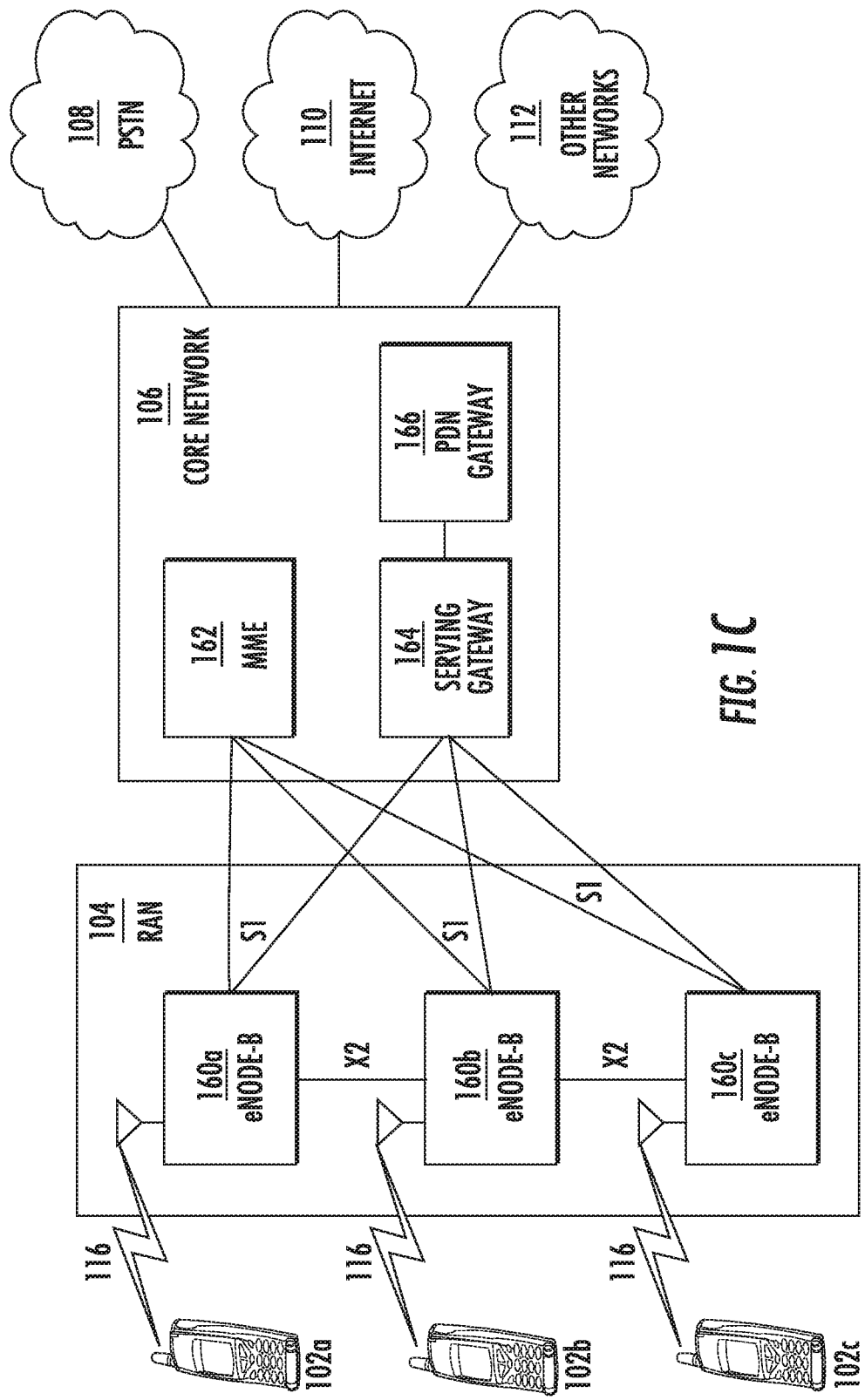
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
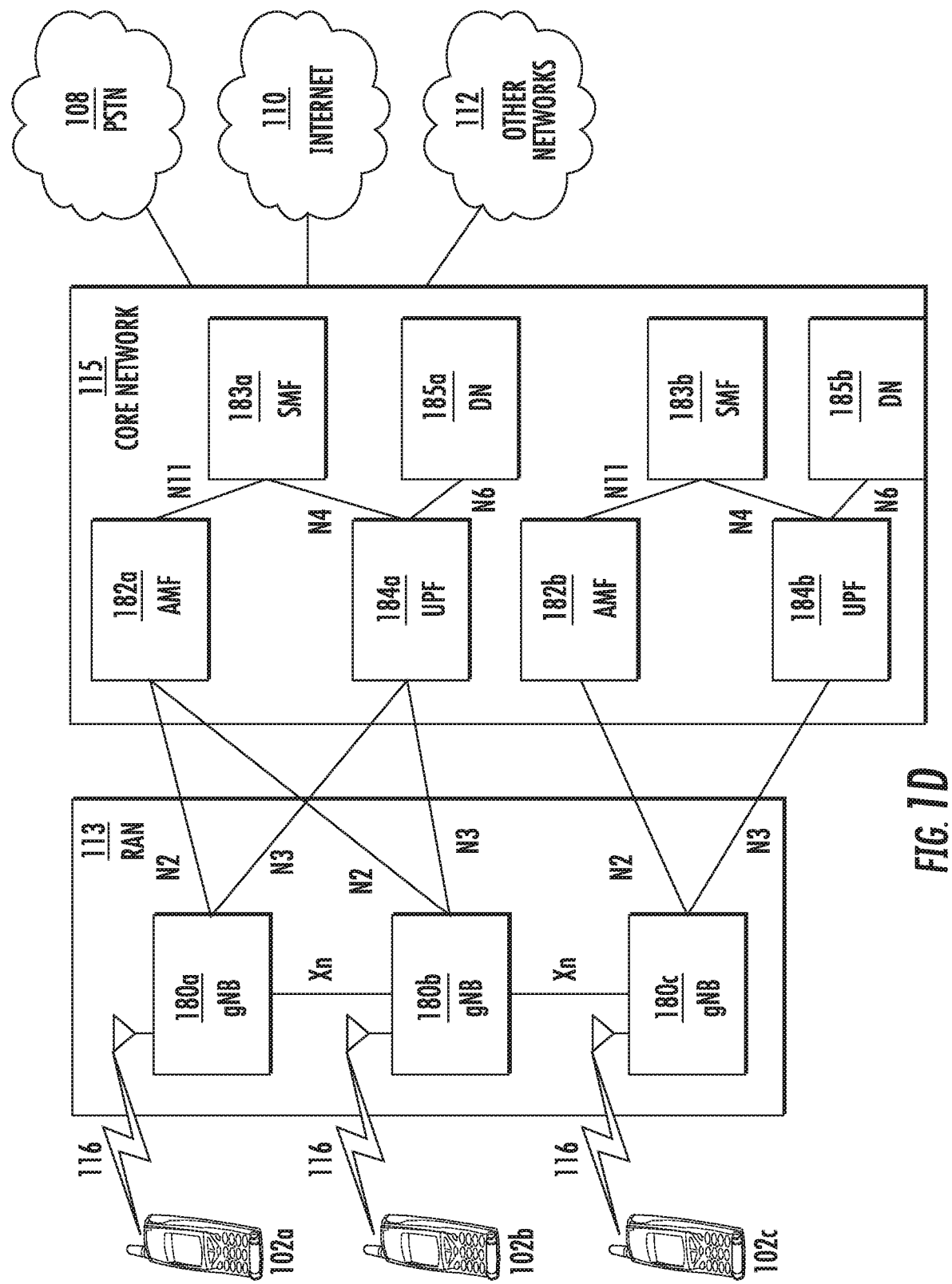
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The use of WTRUs and eNBs in the embodiments described herein is for exemplary purposes. The methods described herein may be performed by any of the devices described herein including but not limited to a WTRU, base station, AP, eNB, gNB, TRP, or any other device that is capable of operating in a wireless communications system.

One or more factors may contribute to the total end-to-end delay experienced by WTRUs. These factors may include but are not limited to scheduling grant acquisition time, transmission time interval (TTI), processing time, and hybrid-automatic repeat requests (HARQ) round-trip time (RTT).

The transmission of a request, grant, HARQ feedback, and/or data may be done in and/or according to the timing of blocks or chunks, which may, for example be or correspond to subframes in some embodiments. These blocks or chunks (e.g., subframes) may have a fixed or known duration (for example, 1 ms). The duration may be referred to as a TTI.

A TTI may be or may include a subframe, a number of subframes, a timeslot, a number of timeslots, a symbol, a number of symbols, and/or a number of time samples. A TTI may be used to represent the time that may correspond to the TTI. For example, a TTI may be or may include the time that may correspond to at least one of a subframe (e.g., 1 ms), a number of subframes, a timeslot (e.g., 0.5 ms), a number of timeslots, a symbol, a number of symbols, a time sample (e.g., Ts) and/or a number of time samples. The term Ts may be used to represent a time sample and/or the time corresponding to a time sample. In the examples and embodiments described herein, timeslot and/or subframe may be used as non-limiting examples of a TTI. Other examples of TTIs may be used and still be consistent with the examples and embodiments described herein.

Feedback, for example HARQ feedback, may be transmitted, for example by any of the devices described herein, following successful or unsuccessful reception of a transmission. Feedback may comprise a positive acknowledgement (ACK) or negative acknowledgement (NACK) that may indicate successful or unsuccessful reception of a transmission, respectively.

There may be a time relationship between a transmission (for example, an actual transmission or scheduled transmission) by a sender and when the receiver or intended receiver may transmit feedback. This relationship may be a known, configured, or expected time relationship. For example, when data is or may be transmitted and/or received (e.g., actually transmitted and/or received or scheduled to be transmitted and/or received) at time n, feedback (for example, HARQ feedback) may be transmitted and/or received at time n+x where x may be equal to k×TTI. The feedback may be for or may correspond to the data or transmission. The feedback may indicate successful or unsuccessful reception of the data or transmission. In this example, k may be an integer such as 4.

In another example, when data is or may be transmitted and/or received (e.g., actually transmitted and/or received or scheduled to be transmitted and/or received) (for example, in the downlink (DL)) in subframe n, HARQ feedback (e.g., for or corresponding to the data) may be transmitted and/or received in subframe n+4 (for example, in the uplink (UL)). The n+4 HARQ or feedback timing (e.g., timing relationship) may, for example, be applicable to a system using frequency division duplexing (FDD). In another example, for a system using time division duplex (TDD), HARQ timing may depend on the TDD configuration (e.g., the UL/DL configuration).

For example, HARQ feedback for or corresponding to data that is or may be transmitted and/or received at time n, may be available at time n+(k×TTI) where k may be 4 for FDD and/or at least 4 for TDD, which may depend on the TDD configuration. Time n may be subframe n. Time n+(k×TTI) may be subframe n+k.

In another example, HARQ feedback for a DL transmission in DL TTI n may be transmitted and/or received in an UL TTI that is at least k×DL TTI after DL TTI n. This may be the next UL TTI that is at least k×DL TTI after DL TTI n.

A timeline may be a scheduling timeline and/or a feedback timeline (for example, a HARQ timeline). A scheduling timeline may include a relationship between when a scheduling grant or allocation is transmitted or received and when corresponding data may be transmitted or received. For example, for a grant or allocation received in TTI n, data may be received in TTI n+k. The value of k may, for example, be 0 or 1 for DL reception. The value of k for UL transmission may, for example, be an integer such as 4 or at least 4. The example timeline relationship may be represented by TTI n TTI n+k. Another example timeline relationship may be time n→time n+x.

A timeline may be considered a normal timeline for a first value of x or k. A timeline may be considered a shortened timeline for a second value of x or k that may be less than the first value of x or k. For example, k may be 4 for a normal timeline and 2 or 3 for a shortened timeline. A shortened timeline may have a lower latency than a normal timeline.

A WTRU may adjust its reception and/or transmission timing based on the received frame timing of a cell (for example, received DL frame timing). The cell may be, for example, a reference cell. A WTRU may synchronize its reception and/or transmission timing to the received frame timing of the cell.

The cell may be a primary cell (PCell), a secondary cell (SCell), or a primary SCell (PSCell), which in some embodiments may be used with carrier aggregation (CA) or dual connectivity. A PCell may be a primary serving cell. A WTRU may have for example, at least one or only one PCell. An SCell may be a secondary serving cell. A WTRU may have at least one SCell. A WTRU may aggregate a PCell with one or more SCells, or the WTRU may aggregate multiple SCells, which may for example increase bandwidth. A PSCell may be a primary SCell. A WTRU may have at least one PSCell. For example, a WTRU may have one PSCell per group of SCells that may belong to the same medium access control (MAC) entity. A WTRU may have at least one MAC entity. A PCell and one or more SCells may be associated with a MAC entity. A PSCell and one or more SCells may be associated with a MAC entity.

The timing of frame boundaries of frames received by the WTRU may vary over time due to WTRU motion and/or other factors, such as, oscillator drift. A WTRU may, for example, autonomously, adjust its reception and/or transmission timing accordingly. For example, the WTRU may autonomously, adjust its downlink reception timing and/or uplink transmission timing according to the received downlink frame of a cell, and that timing may change.

A WTRU may apply a timing advance (TA) to its UL transmission timing. A WTRU may start transmission of an UL time unit (e.g., a subframe or TTI) some amount of time (e.g., an applied TA) before the start of the corresponding DL time unit. For example, a WTRU may start transmission of UL subframe n an applied TA before the start of the corresponding DL subframe n. A TA may be in units of time such as time samples (for example, Ts) or an integer number of time samples (for example, an integer number of Ts). TAs may be applied in this way in order to account for signals arriving at an eNB at different times due to cell size. A TA may be used to transmit earlier or later in order to account for the distance the WTRU is from the eNB and enable transmissions from the WTRU to better align with those of other WTRUs at the eNB receiver. For example, when the WTRU is close to the eNB, a small TA may be applied such that the WTRU sends its signal at a later time. In this example, when the WTRU is a longer distance from the eNB, a larger TA may be applied such that the WTRU sends its signal at an earlier time. Use of TAs as in this example may enable the eNB to receive signals from WTRUs at different distances at similar times.

A WTRU may receive TA commands, for example, from a cell or an eNB with which the WTRU may communicate. A TA command may be received during a random access procedure from the eNB. A TA command may be received independent from a random access procedure. A TA command may be received in a MAC control element (CE). The eNB may provide TA commands such that UL transmissions from one or more WTRUs in or corresponding to a time or time period (e.g., a subframe or TTI) may arrive at the cell nominally at the same time or within a receive time window. A WTRU may apply one or more received TA commands to adjust its UL timing. A TA command may provide a TA value or a TA adjustment (e.g., up or down).

A WTRU may apply a TA or a TA adjustment, for example according to a received TA command, an amount of time after receiving the TA command. The amount of time may be an integer number of TTIs (for example, 6 TTIs) after the TTI in which the command is received. The amount of time may be fixed or configured. A WTRU may apply a TA according to the TA value that it receives. A WTRU may apply a TA that is an adjusted TA (e.g., after adjusting the TA). A WTRU may adjust a TA according to a TA adjustment that it receives. For example, a WTRU may adjust a previously applied TA according to a TA adjustment that it receives, and the WTRU may then apply and/or use the adjusted TA. The phrases "applying a TA adjustment" and "applying a TA according to a TA adjustment" may be used interchangeably herein. At the time that a WTRU applies the TA, the time difference between the receive timing and transmission timing of the WTRU may be set to the applied TA. For example, it may be set exactly to or within an allowed tolerance of the applied TA.

After application of a TA (e.g., an applied TA), the difference between the receive timing and transmission timing of the WTRU may drift away from the applied TA. The WTRU may adjust its transmission timing such that the time difference between its receive timing and transmission timing may be within a threshold or tolerance value of an applied TA.

A TA adjustment may be in increments of a TA step value. For example, a TA adjustment may be requested, commanded, received, and/or applied in increments of a TA step value. A TA step value may, for example, be an integer multiple of a time sample (for example, Ts). A TA step value may, for example, be 16 Ts. For a Ts of 1/(30720000) seconds and an example TA step value of 16 Ts, the example TA step value would be ~0.52 us.

A TA command may indicate that the applied TA should be increased or decreased, which may be for example by an amount of time that may be referred to as ATA. A TA command may indicate to apply a new TA, for example to replace the existing applied TA with a new applied TA. The TA command may include the new value for the applied TA. Replacement of an existing applied TA may be applicable when the existing applied TA is zero.

In some examples and embodiments described herein, an eNB, cell, serving cell, and component carrier (CC) may be used interchangeably and/or substituted for each other and still be consistent with examples and embodiments described herein.

As described above, an eNB may transmit a TA command to a WTRU. The WTRU may not receive the transmitted TA command, for example due to interference or poor channel conditions. The eNB may not know when a WTRU misses a TA command. An eNB may not know the applied TA (for example, the exact applied TA) that a WTRU is using, for example because the eNB does not know that the WTRU missed one or more TA commands.

An applied TA may be the TA that a WTRU applies, for example, to adjust its UL timing where the adjustment may be relative to its DL timing. The applied TA of a WTRU may not be the same as the sum of one or more (for example, all) TA commands transmitted by an eNB to the WTRU. In some examples and embodiments described herein, a TA may be used to represent an applied TA.

Figure 2:
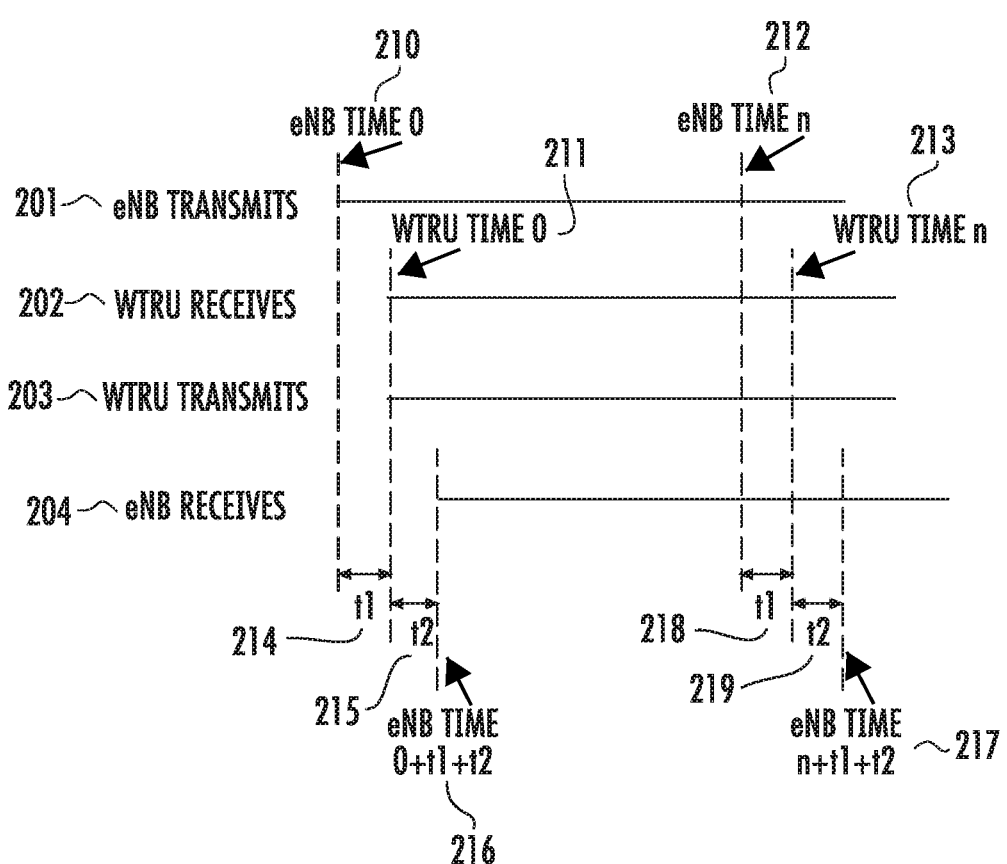
FIG. 2 is an example of transmission reception timing.

FIG. 2 is an example of transmission and reception timing 200 between two nodes that may communicate with each other. In this example, an eNB may transmit 201 at what it sees as time 0 210. A WTRU may receive 202 the transmission an amount of time, t1 214, later than time 0 210 of the eNB, for example due to propagation delay. Accordingly, the WTRU may consider its time 0 211 to be the time when it receives what was sent by the eNB at time 0 210 of the eNB. The WTRU may transmit 203 to the eNB at time 0 211 of the WTRU. The eNB may receive 204 the transmission from the WTRU an amount of time, t2 215, after the transmission by the WTRU. This delay may, for example, also be due to propagation delay. As a result, the reception at the eNB may be at time t1+t2 216. This may, for example, be due to the two-way or round trip delay between the WTRU and the eNB. The values of t1 and t2 may be equal or approximately equal, for example when there is channel reciprocity.

In the example of FIG. 2, an eNB start time of n 212 may be used and the same principles may apply. For example, a WTRU may receive 202 the transmission an amount of time, t1 218, later than time n 212 of the eNB, for example due to propagation delay. Accordingly, the WTRU may consider its time n 213 to be the time when it receives what was sent by the eNB at time n 212 of the eNB. The WTRU may transmit 203 to the eNB at time n 213 of the WTRU. The eNB may receive 204 the transmission from the WTRU an amount of time, t2 219, after the transmission by the WTRU. This delay may, for example, also be due to propagation delay. Accordingly, eNB may receive the WTRU transmission at eNB time n+t1+t2 217.

As described above, communication between an eNB and different WTRUs may include different delays. It may be desirable for the transmissions from a set of WTRUs to fall within a time window, which may for example be (and/or may be referred to as) a reception window of the eNB. As described above, TAs may be used to adjust when the WTRUs transmit in the UL, for example in order to adjust when the eNB receives the transmissions.

Figure 3:
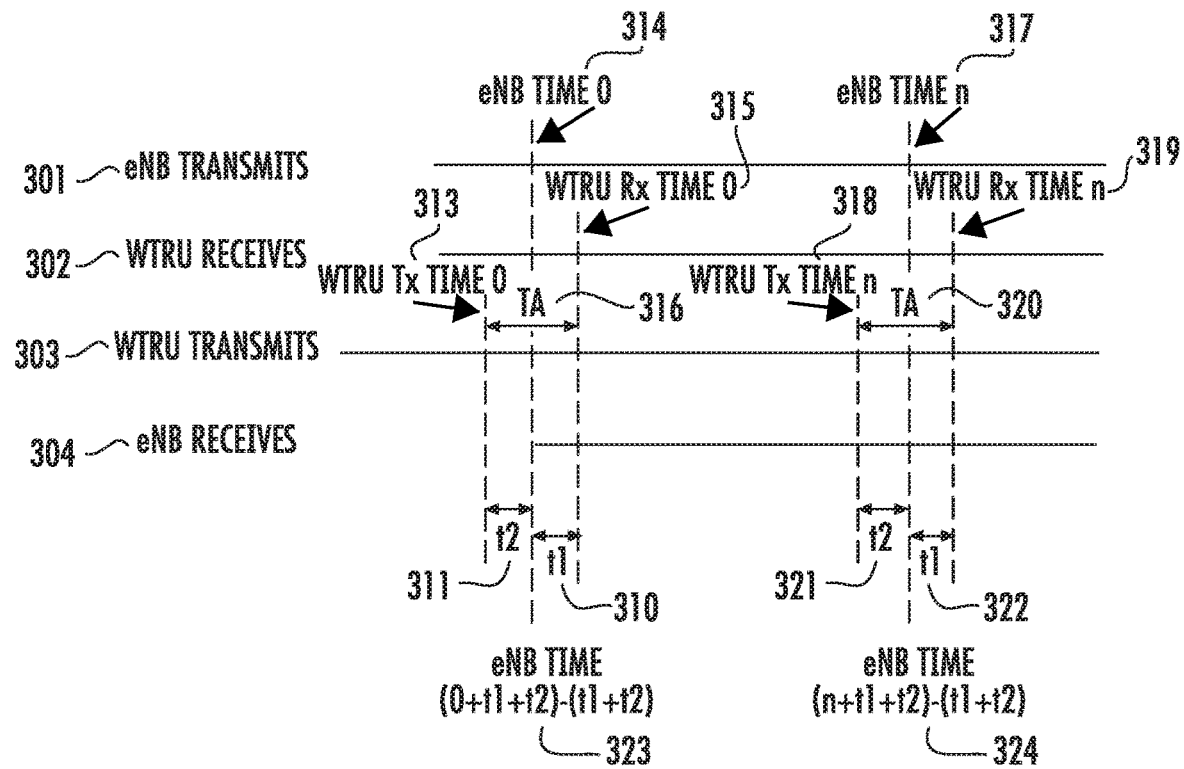
FIG. 3 provides an example of transmission and reception timing with a TA applied.

FIG. 3 provides an example of transmission and reception timing with a TA applied 300. In this example, the delay from eNB transmission 301 to WTRU reception 302 may be t1 310, and the delay from WTRU transmission 303 to eNB reception 304 may be t2 311. A TA 316 may be relative (e.g., applied or used relative) to the WTRU reception time. The applied TA 316 may be t1+t2, for example, in order to align reception by the eNB of a WTRU's time 0 transmission 313 with the eNB's time 0 314. The WTRU may transmit its time 0 transmission 313 (for example, in the UL) at TA 316 prior to its time 0 reception 315 (for example, in the DL). The eNB may receive the transmission t2 later which may align with the eNB's time 0 314 transmission time. By using a TA 316 of t1+t2, the eNB may receive the transmission from the WTRU at eNB time 323 (0+t1+t2)−(t1+t2). eNB time 323 may be the reception time without applying a TA (0+t1+t2) minus the applied TA 316 (t1+t2) which in this example is equal to eNB time 0 314. The eNB may transmit 301 at the eNB's time 0 314. The WTRU may receive 302 the eNB time 0 314 transmission t1 310 later and the WTRU may use that time for the WTRU's receive time 0 315.

In the example of FIG. 3, a time n (e.g., an eNB time n 317, a WTRU transmit time n 318, and/or a WTRU receive time n 319) may be used instead of a time 0 and the same principles may apply. The WTRU may transmit 303 at TA 320 prior to the WTRU's reception at time n 319. In this example, the delay from eNB transmission 301 to WTRU reception 302 may be t1 322, and the delay from WTRU transmission 303 to eNB reception 304 may be t2 321. The eNB may receive the transmission t2 later which may align with the eNB's time n 317 transmission time. The eNB may receive the transmission at eNB time 324 which may be (n+t1+t2)−(t1+t2) and may be equal to eNB time n.

Alignment with eNB time 0 in the example of FIG. 3 is for exemplary purposes. A TA for any other adjustment or alignment may be consistent with the examples and embodiments described herein.

UL and DL are used as non-limiting examples of transmission directions. Other directions, such as sidelink, may be used additionally or alternatively and still be consistent with the examples and embodiments described herein.

A WTRU or a MAC entity of a WTRU or any of the other devices described herein may have and/or maintain at least one time alignment timer (TAT). For example, a WTRU may have and/or maintain a TAT for a (e.g., each) timing advance group (TAG). A TAG may be or may include a group of serving cells (e.g., of a WTRU) that use the same timing reference, the same timing reference cell and/or the same TA value. A TAG may be or may include a group of serving cells with configured UL. The timing reference, timing reference cell, and/or TA may apply to cells with configured UL. A primary TAG (pTAG) may be a TAG that includes a PCell or a PSCell. A secondary TAG (sTAG) may be a TAG that does not include a PCell and/or does not include a PSCell. A WTRU and a MAC entity may be used interchangeably in the examples and embodiments described herein.

A TAT may be configured or may be configurable. A TAT may be associated with a TAG. A TAG may be associated with a MAC entity. A TAT may be used to control how long a MAC entity considers the serving cells associated with the TAG to be uplink time aligned.

A MAC entity may start or restart a TAT, for example when the MAC entity receives a TA command. The TA command may be received in a MAC-CE or Random Access Response (RAR). For example a TA command may be received in a RAR during or following a random access procedure. For example, the MAC entity may start or restart a TAT associated with an indicated TAG, which may be indicated by the TA command.

A TAT may expire. The TAT may be associated with a TAG that may be associated with a MAC entity. When a TAT expires, for example when a MAC entity determines that a TAT expires, or when a MAC entity considers a TAT to have expired, the MAC entity may perform at least one TAT expiry action, including but not limited to the following:

Flushing one or more (e.g., all) HARQ buffers for one or more (e.g., all) serving cells, which may, for example, belong to or be associated with the TAG for which the TAT expired;

Flushing one or more (e.g., all) HARQ buffers for one or more serving cells, which may include flushing for example one or more (e.g., all) HARQ buffers for all serving cells that are associated with the MAC entity (for example, when the TAG may be a pTAG);

Releasing and/or notifying radio resource control (RRC) to release the physical uplink control channel (PUCCH) and/or sounding reference signal (SRS), for one or more (e.g., all) serving cells, for example one or more serving cells that belong to the TAG for which the TAT may have expired;

Releasing and/or notifying RRC to release PUCCH and/or SRS, for one or more serving cells where the one or more serving cells may be all serving cells that are associated with the MAC entity (for example, when the TAG for which the TAT may have expired may be a pTAG);

Clearing one or more (e.g., any) of the DL assignments and/or one or more (e.g., any) UL grants where the assignments and/or grants may be for the MAC entity (for example when the TAG for which the TAT may have expired may be a pTAG); and Considering one or more (e.g., all) TATs, which may associated with the MAC entity, as expired, for example when the TAG for which the TAT may have expired may be the pTAG.

There may be one or more HARQ entities at a MAC entity. For example, there may be a HARQ entity for a (e.g., each) serving cell that has a configured UL. A HARQ entity may maintain a number of HARQ processes that may be parallel, for example, to allow transmissions to take place continuously while waiting for the HARQ feedback on the successful or unsuccessful reception of previous transmissions. A HARQ process may be associated with a HARQ buffer.

A MAC entity may not perform one or more UL transmissions on a serving cell when the TAT associated with the TAG to which the serving cell belongs is not running. For example, a MAC entity may not perform one or more UL transmissions (e.g., any UL transmission) on a serving cell except a Random Access Preamble transmission when the TAT associated with the TAG to which this serving cell belongs is not running. The terms "belong to" and "associated with" may be used interchangeably in the examples and embodiments described herein.

A MAC entity may not perform one or more UL transmissions on a serving cell (for example, associated with the MAC entity) when the TAT associated with the pTAG is not running. For example, a MAC entity may not perform an UL transmission on any serving cell except the Random Access Preamble transmission on the special cell (SpCell) when the TAT associated with the pTAG is not running. A SpCell may, for example be a PCell or a PSCell.

When a timer, such as a TAT, is started or restarted, the timer may be set to 0 or to a maximum or expiry value that may be configured. The timer may expire when it reaches zero (e.g., when counting down) or when it reaches a maximum or expiry value (e.g., when counting up). A timer, such as a TAT, may be adjusted (e.g., incremented or decremented) in or for a TTI (e.g., each TTI). For example a TAT may be adjusted in or for a TTI or subframe. A TAT may, for example, be adjusted in or for each TTI or subframe. A timer such as a TAT may not be running when it expires or may expire, is expired, and/or when it is stopped.

A receive-transmit (Rx-Tx) time difference may be the time difference between a receive timing and transmission timing of a WTRU or any of the devices described herein. The Rx-Tx time difference may be different from the value of an applied TA. A Rx-Tx time difference may be an applied TA plus or minus an offset. The offset may be due to, for example, at least one of WTRU movement, oscillator drift, and/or errors in applying TA. A WTRU may adjust its Rx-Tx time difference to be within a threshold or tolerance value of an applied TA. A WTRU may be configured to (e.g., may receive a configuration to) measure and/or report a WTRU Rx-Tx time difference.

A WTRU may (e.g., based on a configuration) measure and/or report a WTRU Rx-Tx time difference, to for example an eNB. A WTRU may (e.g., based on a configuration) measure and/or report a WTRU Rx-Tx time difference, for example periodically.

In an example, the WTRU Rx-Tx time difference may be defined as TWTRU_RX-TWTRU_TX. TWTRU_RX may be the WTRU received timing of downlink time unit (e.g., subframe or radio frame) #i from, for example, the serving cell. The received timing may be defined by the first detected path in time. TWTRU_TX may be the WTRU transmit timing of uplink time unit (e.g., subframe or radio frame) #i. A reference point may be used for the WTRU Rx-Tx time difference measurement. For example, the reference point may be the WTRU antenna connector.

In the examples and embodiments described herein, TA, applied TA, WTRU Rx-Tx time difference, Rx-Tx time difference, and UL/DL time difference may be used interchangeably and/or substituted for each other and still be consistent with this disclosure.

In an example, a UL transmission (e.g., frame transmission) may take place [(NTA+NTAoffset)×Ts] before the reception of a corresponding downlink transmission (e.g., frame transmission) from a cell (e.g., a reference cell), which may be before the reception of a first detected path (e.g., in time). The first detected path may be received from the corresponding downlink transmission from the cell. NTA may be a TA or an applied TA. NTAoffset may be an offset from the TA or applied TA. The Rx-Tx time difference may be [(NTA+NTAoffset)×Ts].

Processing time may be or may include the time needed or used to process data and/or control signaling or information, for example at or by the WTRU and/or eNodeB (eNB) or any other device described herein. Processing data and/or control signaling or information may be or may include, for example, encoding, decoding, interpreting, understanding, preparing, using and/or applying the data and/or control signaling. For example, processing time for DL data reception may include (e.g., may include time for) one or more of: decoding control signaling (e.g., DL grant) to determine a location and/or decoding parameters for a data channel, attempting to decode the data channel, determining whether the data was received successfully, delivering the received transport block (TB) to higher layers, and/or preparing to send HARQ feedback. Processing time for preparing HARQ feedback (e.g., for a DL grant) may include one or more (e.g., all) of the components that may be included in the processing time for DL data reception.

Processing time for UL data transmission may, for example, include (e.g., include time for) one or more of: decoding control signaling (e.g., UL grant) to determine a location and/or transmission parameters for a data channel, preparing the transport block (TB) for transmission, and/or determining the power for the transmission. Processing time (e.g., data processing time) may be a function of (e.g., proportional to) the TB size of the data and/or TTI length.

Figure 4:
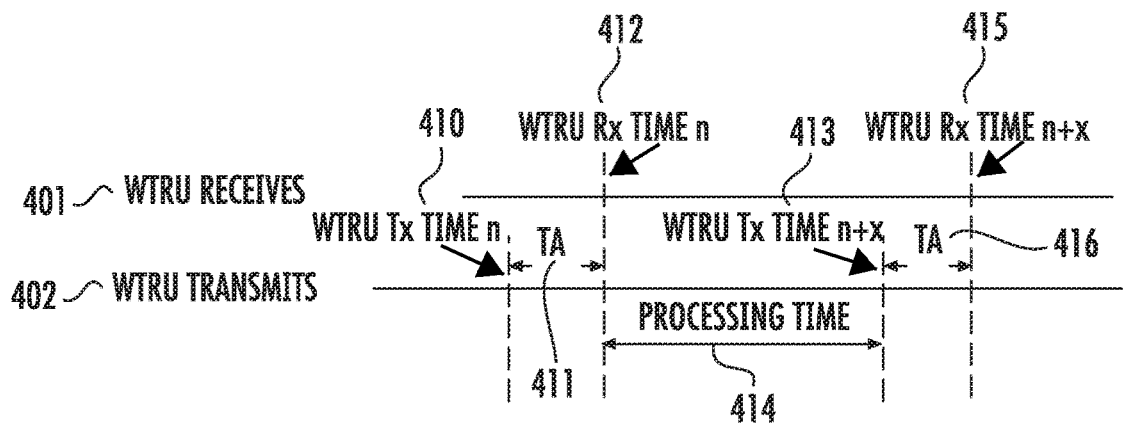
FIG. 4 provides another example of transmission and reception timing with TA applied.

FIG. 4 provides another example of transmission and reception timing with a TA applied 400. In the example of FIG. 4, a WTRU may receive 401 a DL grant at time n 412 (e.g., WTRU Rx time n). The WTRU may process during processing time 414 the DL grant, and the WTRU may transmit 402 HARQ feedback at time n+x 413 (e.g., WTRU Tx time n+x). Time n and time n+x may be in units of subframes, slots, symbols, mini-slots, or TTIs. The value of x may be an integer such as, for example 4. The WTRU Rx timing 412, 415 and WTRU Tx timing 410, 413 (e.g., corresponding Tx timing) may be different, for example due to TA 411, 416. The available processing time 414 between Rx time n 412 and Tx time n+x 413 may be affected by the applied TA 416. For example, the available processing time may be x—applied TA (or x—WTRU Rx-Tx time difference), for example if the starting point for determining the available processing time is the start of WTRU Rx time n 412. If another starting point is used, the available processing time 414 may be adjusted accordingly. For example, the start point for the available processing time 414 may be the end of the time unit (e.g., TTI) in which the control channel may be received or the start of the next time unit after the one in which the control channel may be received. For the subtraction, x and applied TA (or WTRU Rx-Tx time difference) may be converted to common units such as time samples.

In some applications a short TTI (also referred to herein as sTTI) may be used, for example to reduce latency. Use of a short TTI may reduce the processing time available, for example for generating and/or transmitting HARQ feedback in the UL (e.g., associated with DL reception) and/or an UL data transmission.

Use of an applied TA may reduce the available processing time, for example even further. For a shorter TTI, a WTRU may not be able to support some values of applied TA that it may support for a longer TTI.

For example, referring back to FIG. 4, the available processing time for UL transmission (e.g., HARQ or data transmission) following DL data reception or an UL grant may be x minus the applied TA. In this example, x may be 4 TTI and a TTI may have a duration of 1 ms for a long TTI and 0.5 ms for a sTTI. The resulting available processing times may be 4 ms minus the applied TA for the long TTI and 2 ms minus the applied TA for the sTTI. If, for example, a WTRU needs 2 ms to process 1 ms of data and 1 ms to process 0.5 ms of data, then the WTRU may support a 2 ms applied TA for a 1 ms TTI and a 1 ms applied TA for a 0.5 ms TTI. A WTRU may be enabled to handle this reduced TA capability when operating with a sTTI. An eNB may be enabled to handle this reduced TA capability of the WTRU with which it may communicate when operating with a sTTI.

One approach for handling this reduced TA capability may be to limit the TA based on the length of the TTI. For example, the TA may be limited to a maximum value for all WTRUs.

Consideration of additional factors and/or alternate approaches may, however, provide more optimal solutions, because, for example WTRUs may have different processing capabilities and multiple processes may impact processing time. The embodiments described herein provide the following approaches and concepts related to handling TA and processing capabilities in a reduced latency system and related methodologies thereof:

Determining of a processing capability (PC) or processing limit (e.g., a processing time capability or limit, a TA capability or limit, or a Rx-Tx time difference capability or limit), which for example, may be based (e.g., determined based on) on parameters including but not limited to TTI, transport block size (TBS), transmission type, transmission channel, and/or scheduling/HARQ timeline;

Determining, providing, receiving, and/or using a PC (or limit) indication;

Determining, providing, receiving, and/or using a PC (or limit) configuration;

Determining and/or indicating proximity (e.g., headroom) to a PC or limit;

Reporting when the proximity is below a threshold and/or above a threshold;

Triggering (e.g., a report of) and/or reporting the PC (or limit) headroom wherein the report may be triggered and/or sent in the TTI in which the threshold is crossed, which may for example enable correlation with the TTI and/or TBS;

Exception handling when a PC (or limit) is violated (for example, exceeded for a PC/limit that may be a maximum or gone under for a PC/limit that may be a minimum) where exception handling may include but is not limited to capping a processing value (PV) (e.g., setting a PV to a PC), stopping one or more transmissions in the UL (e.g., for a short TTI, for multiple TTIs, and/or all TTIs), stopping a time alignment timer (e.g., in general or for a short TTI), flushing one or more HARQ buffers (e.g., in general or for a short TTI), and/or sending an error message or proximity/headroom report, e.g., using a transmission with a longer TTI length (e.g., when scheduled) or a Physical Random Access Channel (PRACH);

Avoiding an exception condition by prioritizing TTIs, channels, and/or transmission types (e.g., UCI vs. data) and/or dropping at least one lower priority TTI, channel, or transmission type to avoid meeting an exception condition (e.g., for at least one of the TTIs); and/or Applying a TA when using a TTI length less than a subframe where the application may be made at a subframe start (e.g., regardless of TTI length), in (e.g., at the start of) subframe n+6 for a TA received in a TTI (e.g., sTTI) within a subframe (e.g., anytime within subframe n), and/or in subframe n+y, where y may be fixed, configured, or a function of TTI length, a PC, and/or time delta between DL TTI and UL TTI.

A PC may be configured, determined, and/or used. A PC may be a limit or processing limit. The term limit may be used to represent processing limit.

The phrases and terms PC, WTRU PC, or PC of the WTRU, may be used interchangeably herein. Capability and limit may be substituted for each other in the embodiments and examples provided herein and still be consistent with this disclosure.

Channels such as PUSCH and PUCCH are used herein as non-limiting examples of UL channels (e.g., UL data and control channels). PUSCH and PUCCH are channels that may be used with a long TTI (e.g., 1 ms) or a sTTI (e.g., a value shorter than 1 ms). Other channels, for example sPUSCH and sPUCCH, may be substituted for PUSCH and PUCCH and still be consistent with the examples and embodiments described herein.

Channels such as physical downlink shared channels (PDSCH) and physical downlink control channels (PDCCH) are used herein as non-limiting examples of DL channels (e.g., DL data and control channels). PDSCH and PDCCH are channels that may be used with a long TTI (e.g., 1 ms) or a short TTI (e.g., a value shorter than 1 ms). Other channels, for example, sPDSCH and at least one of sPDCCH, ePDCCH, mPDCCH, and nPDCCH, may be substituted for PDSCH and PDCCH and still be consistent with the examples and embodiments described herein.

A normal or regular TTI may be a TTI that may correspond to a subframe (e.g., 1 ms). A long TTI may be considered to be a normal or regular TTI.

A PC may be determined (e.g., a WTRU may determine a processing capability) in a TTI (e.g., each TTI) or for a (e.g., at least one) TTI (e.g., each TTI).

In the embodiments described herein, a WTRU may have, may determine, and/or may be configured with a PC or a processing limit (e.g., of the WTRU) based on at least one of: UL and/or DL TTI length, UL and/or DL TBS, a type of UL transmission (e.g., feedback or data), a channel that may be used for UL transmission (e.g., PUCCH or physical uplink shared channel (PUSCH)), and/or a timeline (e.g., a scheduling and/or HARQ timeline). A PC or limit (e.g., of a WTRU) may alternatively or additionally be based on, may be a function of (e.g., proportional to), may be associated with, may correspond to, may be determined (e.g., by the WTRU) based on, and/or may be configured (e.g., by the eNB) based on at least one processing criteria such as at least one of a plurality of processing criteria. For example, a WTRU may have, may determine and/or may be configured with a PC based on, as a function of, associated with, and/or corresponding to a processing criteria, for example at least one processing criteria that may be at least one of a plurality of processing criteria. A PC configuration may be provided by an eNB, for example via signaling such as RRC signaling and/or broadcast signaling (e.g., in system information). Further, one PC may be a function of another PC. For example, a WTRU may have, may determine and/or may be configured with a PC based on, as a function of, associated with, and/or corresponding to another PC. The PC may be determined by a WTRU using any of the embodiments or examples described herein or a combination thereof.

A PC indication may be provided and/or used. A WTRU may provide (e.g., transmit or signal) a set of one or more processing capabilities of the WTRU, for example to an eNB. A WTRU may provide the set of one or more processing capabilities via signaling such as RRC signaling.

A PC of a WTRU may be or may include at least one of:

A TA capability (or limit), for example a TA that may be supported and/or used;

A maximum TA capability (or limit), for example a maximum TA that may be supported and/or used;

A Rx-Tx time difference capability (or limit), for example a Rx-Tx time difference that may be supported and/or used;

A maximum Rx-Tx time difference capability (or limit), for example a maximum Rx-Tx time difference that may be supported and/or used;

A processing time capability (or limit), for example a processing time that may be supported, needed, and/or used;

A minimum or maximum processing time capability (or limit), for example a minimum or maximum processing time that may be supported, needed, and/or used;

An available processing time, for example a time that may be available for processing (e.g., for an UL TTI, a DL TTI, and/or a combination of at least one DL TTI and at least one UL TTI);

A TTI (e.g., TTI length) capability (or limit), for example a TTI that may be supported and/or used;

A minimum TTI (e.g., TTI length) capability (or limit), for example a minimum TTI that may be supported and/or used. The minimum TTI (e.g., TTI length) may be determined based on the number of symbols used and/or configured for a TTI and/or the subcarrier spacing used and/or configured;

A TBS capability (or limit), for example a TBS that may be supported and/or used;

A maximum TBS capability (or limit), for example a maximum TBS that may be supported and/or used;

A timeline (e.g., scheduling and/or HARQ timeline) capability (or limit), for example a timeline (e.g., a value of k in a timeline relationship of TTI n→TTI n+k) that may be supported and/or used; and/or A minimum timeline (e.g., scheduling and/or HARQ timeline) capability (or limit), for example a minimum timeline (e.g., a minimum value of k in a timeline relationship of TTI n→TTI n+k) that may be supported and/or used.

A timeline may be at least one of: a scheduling timeline for UL (e.g., UL transmission); a scheduling timeline for DL (e.g., DL reception); a HARQ timeline for DL transmission (e.g., DL data reception→HARQ feedback transmission in the UL); and/or a HARQ timeline for UL transmission (e.g., UL data transmission→HARQ feedback reception in the DL). A timeline for retransmission (e.g., in the UL) that may be due to a negative HARQ feedback (e.g., in the DL) may be considered a scheduling timeline.

A WTRU may determine, have, maintain, be configured with, and/or use one or more PCs, for example, at least a first PC and a second PC. The first PC and the second PC may be determined based on a different set of processing criteria.

Support and/or use may be by a WTRU and/or an eNB.

A TTI length (e.g., in time such as microseconds, milliseconds, nanoseconds, etc.) may be determined (e.g., by WTRU) based on at least one of a number of symbols and/or a subcarrier spacing that may be configured and/or used.

In the embodiments described herein, a processing criteria may be or may include at least one of:

A number of symbols, which for example may be a number of symbols in a TTI or TTI length that may be used and/or configured (e.g., in or according to a TTI configuration);

A TTI (e.g., in the UL and/or DL), for example a TTI length (e.g., in the UL and/or DL);

The time delta between a TTI in the DL and a TTI in the UL, for example the time between the start or end of a DL TTI that may cause (e.g., trigger or schedule) or result in an UL transmission in an UL TTI and the start of the UL TTI in which the UL transmission may be made;

A TBS, for example a TBS that may be scheduled, granted, allocated, transmitted, or received in a time unit such as a TTI;

A number of layers (e.g., rank) that may be used for reception and/or transmission;

A number of codewords that may be used for reception and/or transmission;

A number of time/frequency resources (e.g., physical resource blocks (PRBs)) that may be scheduled, granted, allocated, transmitted, or received in a time unit such as a TTI;

A coding scheme (e.g., convolutional coding or turbo coding) that may be used for reception of a channel (e.g., a DL channel such as PDSCH) that may precede, correspond to, and/or result in a transmission (e.g., in the UL) to which a TA may apply;

A MIMO receiver scheme (e.g., MMSE, MMSE-IRC, or MMSE-SIC) that may be used for reception of a channel (e.g., a DL channel such as PDSCH) with one or more transmission layers;

A waveform used for a transmission (e.g., CP-OFDM or DFT-s-OFDM); and/or

A numerology (e.g., CP length, subcarrier spacing) used or configured.

Other processing criteria may be or may include but are not limited to a transmission type, a reception type, a channel type, and/or a channel location.

A processing criteria may be or may include a transmission type (e.g., UL transmission type), for example a transmission type to which a TA may apply. A transmission type may, for example be at least one of a control or feedback transmission (e.g., HARQ or CSI feedback), a data transmission, and/or a RS transmission (e.g., DMRS or SRS).

A processing criteria may be or may include a reception type (e.g., DL reception type), for example a reception type that may precede, correspond to, and/or result in a transmission (e.g., in the UL) to which a TA may apply. A reception type may, for example, be at least one of a control reception (e.g., DCI, DCI format, DL grant, UL grant, and/or aperiodic SRS trigger), a data reception, and/or a RS reception (e.g., CRS, DMRS, CSI-RS).

A processing criteria may be or may include a channel type (e.g., UL channel type), for example a channel type to which a TA may apply. A channel type may, for example be at least one of a control channel (e.g., UL control channel such as PUCCH) or data channel (e.g., UL data channel such as PUSCH).

A processing criteria may be or may include a channel type (e.g., DL channel type), for example a channel type on which control or data may be received that may correspond to and/or result in a transmission (e.g., in the UL) to which a TA may apply. A channel type may for example be at least one of a control channel (e.g., DL control channel such as PDCCH) or a data channel (e.g., DL data channel such as PDSCH).

A processing criteria may be or may include a channel location, for example the time and/or frequency location of a DL control channel that may be associated with, may correspond to, and/or may result in an UL transmission to which a TA may apply. A channel location may for example be at least one of a control region (e.g., time or symbols where data may not be present) or a data region (e.g., time or symbols where data may be present).

A processing criteria may be or may include a timeline (e.g., a scheduling and/or HARQ timeline) that may be configured and/or used.

A processing criteria may be or may include a reference signal type or configuration that may be configured and/or used.

In the embodiments described herein, a WTRU may have, may determine, and/or may be configured with a PC (or limit) as defined above that may apply to an UL transmission. For example, the PC (or limit) may be a TA (e.g., a maximum TA), a Rx-Tx time difference (e.g., maximum Rx-Tx time difference), and/or a timeline (e.g., minimum scheduling, HARQ or DL to UL timeline) that may be supported (e.g., by the WTRU) and/or used (e.g., by the WTRU and/or eNB), for example for an UL transmission. The UL transmission may be or may include HARQ feedback that may correspond to a DL data transmission (e.g., PDSCH transmission). The WTRU may transmit the HARQ feedback on an UL channel (e.g., PUCCH or PUSCH channel) with a TTI of TTI_ul. The UL transmission may be or may include an UL data transmission (e.g., PUSCH) that may correspond to a grant (e.g., UL grant) or allocation that may have been received in a DL control channel and/or DCI.

The WTRU may transmit the UL data transmission with a TTI of TTI_ul. The TTI for the DL data transmission and/or for the DL control channel transmission may be TTI_dl. TTI_ul and TTI_dl may be the same or different TTIs (e.g., may have the same or different values).

The TTI in which the PDSCH may be received may be referred to as TTI_dl A. The TTI in which the DL control channel, DCI, grant, and/or allocation for the PUSCH may be received may be referred to as TTI_dl B. TTI_dl A and TTI_dl B may be the same or different. The TTI in which the HARQ feedback and/or PUSCH may be transmitted may be referred to as TTI_ul A.

Further processing criteria may be used in the embodiments described herein. A processing criteria may be or may include at least one of:

A TTI (e.g., TTI_ul and/or TTI_dl);

A time delta between a TTI_dl and a TTI_ul (e.g., between TTI_dl A and TTI_ul A, between TTI_dl B and TTI_ul A, and/or between TTI_ul A and the closer of TTI_dl A and TTI_dl B to TTI_ul A) where the time delta may be the time between the start (or end) of the TTI_dl and the start of the TTI_ul, for example excluding the application of TA;

A TBS (e.g., actual TBS or maximum TBS) of the transport block (TB) or code word (CW) that may be carried by the PDSCH;

A TBS (e.g., actual TBS or maximum TBS) of another TB or CW that may be received by the WTRU (e.g., during TTI_dl A) that may impact the processing time needed or used by the WTRU, for example when DL MIMO may be used;

A number of TBs or CWs that may be received by the WTRU (e.g., the number that may be received during TTI_dl A);

The channel (e.g., PUCCH or PUSCH) that may be used by a WTRU for transmission of a feedback (e.g., HARQ feedback), for example, a result of whether the WTRU transmits, will transmit, or intends to transmit the feedback (e.g., HARQ feedback) on a PUCCH or PUSCH channel;

The set of channels (e.g., PUCCH only, PUSCH only, or PUSCH and PUCCH) that may be transmitted in a TTI, for example when the WTRU may transmit a feedback;

The result of whether the WTRU transmits, will transmit, or intends to transmit in the UL in a TTI on PUCCH only, PUSCH only, or PUSCH and PUCCH, for example when the WTRU may transmit a feedback (e.g., HARQ feedback);

The result of whether the WTRU received an UL grant for PUSCH transmission in the TTI (e.g., TTI_ul A) in which the WTRU may transmit the feedback (e.g., the WTRU may need additional time to prepare the UL transmission);

The TBS (or maximum TBS) of at least one transport block that the WTRU may transmit on a PUSCH in the TTI in which the WTRU may transmit the feedback;

The number of layers, the number of PRBs, and/or the coding scheme that may be used for reception of the PDSCH;

The TBS (or maximum TBS) of at least one transport block that the WTRU may transmit on a PUSCH in the TTI for which UL resources are allocated or granted (e.g., TTI_ul A);

The result of whether the WTRU received a DL grant or allocation in the TTI (e.g., TTI_dl B) in which the WTRU received the UL grant or allocation (e.g., whether the WTRU may need to process a DL TB prior to the UL transmission);

The result of whether the WTRU received a DL grant or allocation in or after TTI_dl B and before TTI_ul A (e.g., whether the WTRU may need to process a DL TB prior to the UL transmission);

The result of whether the WTRU may transmit PUSCH based on a CP-OFDM waveform or a DFT-s-OFDM waveform; and/or The result of whether the WTRU may transmit or receive signals based on a first numerology (e.g., a first subcarrier spacing) or a second numerology (e.g., a second subcarrier spacing).

For example, for a TTI value (e.g., TTI_dl and/or TTI_ul value) of x (e.g., 2 symbols, 4 symbols, or 1 timeslot), a WTRU may have, may determine, or may be configured with a maximum TA (or maximum Rx-Tx time difference) that it may use, may be expected to use, and/or may support as y. For example, the value of y may be a function of x or proportional to x. For example, y may equal x/2. The value of y may be a function of a TBS, for example a function of TTI and TBS.

A PC (or limit) may be represented in one or a multiple (e.g., integer number) of time units. A Time unit may be or may include but is not limited to a subframe, a timeslot, a mini-slot, a TTI, a symbol, a time sample, an integer number of timeslots and/or mini-slots, an integer number of symbols, a fraction of a symbol (e.g., ½ symbol or ¼ symbol), an integer number of time samples, a TA step, or an integer number of TA steps. A TA step may, for example be 16 time samples. A PC may or may also be represented in time such as in microseconds and/or nanoseconds.

A PC, a TTI, a time unit, and/or a multiple of time units may be quantized and/or may be represented by a value in or an index into a set, list, or table of values, for example, when determined, configured, provided, and/or reported.

A PC may be represented by a category (e.g., an index to a category) within a set of categories (e.g., short, medium, long). A category may represent a PC value. For example, short may mean or may be defined as a PC of x, medium may mean or may be defined as a PC of y, and long may mean or may be defined as a PC of z. For example, x, y, and z may be or may represent values, e.g., PC values such as maximum or minimum values that may be supported, needed, and/or used. The values of x, y, and z may follow the relationship x<y<z.

A processing criteria may be determined (e.g., a WTRU may determine a processing criteria) in a TTI (e.g., each TTI) or for a (e.g., at least one) TTI (e.g., each TTI).

A PC may be determined based on the reference signal type or configuration that may be used. One or more reference signal types or configurations may be used for a physical channel (e.g., PDSCH or PUSCH) and the PC may be based on the reference signal types or configurations that may be configured and/or used.

In the embodiments described herein, a WTRU may provide (e.g., send, signal, report or transmit) a PC (e.g., of the WTRU), for example to an eNB. A WTRU may be configured or requested (e.g., by a eNB) to provide a PC (e.g., to the eNB). A WTRU may provide a PC in response to a request to provide one or more capabilities of the WTRU. A WTRU may provide a PC in response to a request to provide at least the PC. For example, a WTRU may include its PC in a WTRU capabilities message.

In some examples and embodiments, the terms provide, send, signal, report, and transmit may be used interchangeably.

A WTRU may provide a PC (e.g., to an eNB) that may be associated with, and/or may correspond to a processing criteria.

For example, a WTRU may provide or indicate one or more TTIs (e.g., TTI lengths) that the WTRU may support or a minimum TTI that the WTRU may support. A WTRU may indicate a PC for a TTI or a supported TTI (e.g., each TTI or supported TTI). For example, a WTRU may provide a maximum TA, a maximum Rx-Tx time difference, and/or a maximum TBS that the WTRU may support for a TTI or supported TTI. In another example, a WTRU may provide a minimum processing time that the WTRU may need or use for a TTI or supported TTI. In another example a WTRU may provide a maximum TA (or maximum Rx-Tx time difference) that the WTRU may support for at least one of (or a combination of at least two of) a TTI (UL and/or DL TTI), a TBS, a transmission type, and/or a channel type.

TTI, TTI length, and TTI duration may be used interchangeably.

In another example, a WTRU may indicate one or more timelines (e.g., a value of k in a timeline relationship of TTI n→TTI n+k) that the WTRU may support or a minimum timeline that the WTRU may support. A WTRU may provide a PC for a timeline that the WTRU may support. For example, a WTRU may provide a maximum TA, a maximum Rx-Tx time difference, and/or a maximum TBS that the WTRU may support for a timeline that the WTRU may support.

In the embodiments described herein, a WTRU may be configured with a PC (e.g., processing limit), and the configuration (e.g., PC configuration) may be provided by an eNB and/or received by the WTRU. The configuration may be provided and/or received in WTRU-specific signaling and/or cell specific signaling. The signaling may be RRC signaling. The signaling may be broadcast signaling. For example, the PC may be provided and/or received in system information such as system information blocks (SIBs).

A WTRU may use or be configured to use a first TTI, for example a normal or regular TTI. An eNB may provide and/or the WTRU may receive a PC, for example when the WTRU is configured for a TTI such as a second TTI or a short TTI (sTTI). The second TTI may be shorter than the first TTI. The PC may be based on, a function of, associated with, and/or correspond to one or more processing criteria described above.

The terms criteria and criterion may be used interchangeably herein. For example, "a criteria" may be used to represent "a criterion".

For example, an eNB may provide and/or a WTRU may receive one or more TTIs (e.g., TTI lengths) that the WTRU and/or eNB may support or use. The WTRU may be configured (e.g., by an eNB) with one or more TTIs (e.g., TTI lengths) that the WTRU may use. The WTRU may be configured with a PC for a TTI or configured TTI (e.g., each TTI or configured TTI). Alternatively or additionally, the WTRU may be configured (e.g., by an eNB) with a maximum TA, a maximum Rx-Tx time difference, and/or a maximum TBS that the WTRU may support (e.g., need to support), for example for a configured TTI. Alternatively or additionally, the WTRU may be configured (e.g., by an eNB) with a maximum TA (or maximum Rx-Tx time difference) that the WTRU may support (or need to support) for at least one of (or a combinations of at least two of) a TTI (UL and/or DL TTI), a TBS, a transmission type, and/or a channel type.

Alternatively or additionally, the WTRU may use or be configured to use a first timeline, for example a normal or regular timeline. In this example, the WTRU may be configured or further configured (e.g., by an eNB) with a second timeline (e.g., shortened timeline) that the WTRU may use.

An eNB may provide and/or a WTRU may receive a PC when the WTRU may be configured for a timeline such as a second timeline or a shortened TTI. A second timeline may be shorter than a first timeline. For example, a WTRU may be configured (e.g., by an eNB) with a maximum TA, a maximum Rx-Tx time difference, and/or a maximum TBS that the WTRU may support (e.g., need to support), for example for a configured timeline that may be a shortened timeline.

The non-exhaustive and non-exclusive embodiments described below pertain to the proximity of a PV to a PC. The PC may define a limit, or what the WTRU is capable of doing or supporting (e.g., with respect to processing and/or a transmission). The PV may define what the WTRU needs to do or support (e.g., with respect to processing and/or a transmission) based on, for example, the configuration and/or the UL/DL grant received by the WTRU. In the embodiments described herein, a proximity (e.g., of a PV) to a PC (or limit), may be determined, provided (e.g., indicated) and/or used.

A PV may be a value, e.g., a current or recent value, of a processing parameter. A PV may be related to an UL transmission and/or a DL transmission (or reception). For example, a processing parameter may be or may include at least one of:

A TA (e.g., an applied TA);

A Rx-Tx time difference;

A processing time (e.g., a processing time that may be available and/or used), for example, a processing time based on at least one of TTI, TTI length, number of symbols, number of OFDM symbols, a symbol length, number of samples, and number of time samples;

A TTI (e.g., TTI length), for example a TTI (e.g., TTI length) that may be identified, requested, and/or configured;

A TBS; and/or

A timeline or timeline value (e.g., value of k in a timeline relationship of TTI n→TTI n+k) that may be requested, configured, and/or indicated semi-statically (e.g., via RRC signaling) and/or dynamically (e.g., in a DCI).

A WTRU may measure a processing parameter (e.g., as defined above) to determine its value. The WTRU may average and/or filter one or more measurements of a processing parameter to determine the value of the processing parameter.

A WTRU may determine the proximity of a PV to a PC. For example, the proximity of a PV to a PC may be the difference between the PV and the PC, e.g., PV-PC or PC-PV. The proximity of a PV to a PC may be referred to herein as a headroom. The term proximity as used herein may represent the proximity (e.g., determined proximity) of a PV to a PC. Accordingly, proximity and headroom may be used interchangeably.

A PC may be determined by a WTRU, for example as described herein in one or more embodiments or examples. A PC may be configured (e.g., received in a configuration) for example as described herein in one or more embodiments or examples. A PC may be configured (e.g., received in a configuration) from an eNB. Reception of a configuration may be by a WTRU.

A PV and/or proximity of a PV to a PC may be determined (e.g., by a WTRU) in a TTI or for a (e.g., at least one) TTI. Further, the WTRU may determine the PV and/or proximity in each TTI or for each TTI.

In the embodiments described herein, a WTRU may also determine that (or when) a PV may meet (or satisfy) or meets (or satisfies) a threshold comparison condition. The PV may meet (or satisfy) a threshold comparison condition when it reaches (e.g., is at) a threshold, crosses a threshold, exceeds a threshold, and/or is less than a threshold. The PV may meet (or satisfy) a threshold comparison condition when it may reach (e.g., may be at) a threshold, may cross a threshold, may exceed a threshold, and/or may be less than a threshold.

For example, a WTRU may determine that (or when) a PV may reach (e.g., be at) a threshold, may cross a threshold, may exceed a threshold, and/or may be less than a threshold. A WTRU may trigger or provide a report or indication, e.g., to an eNB, when (e.g., when the WTRU may determine that) a PV may meet (or satisfy) or meets (or satisfies) a threshold comparison condition. The report or indication may indicate that a PV has met (or has satisfied) a threshold or threshold comparison criteria.

In the embodiments described herein, a WTRU may trigger or provide a report or indication, e.g., to an eNB, to indicate that a PV may meet, may satisfy, may have met and/or may have satisfied a threshold comparison condition. A report or indication may include (e.g., may include a value or representative indication of the value of) a PV. A report or indication may identify or may include an identification of which threshold comparison condition was met (or satisfied).

In the embodiments described herein, a WTRU may determine that (or when) a proximity of a PV to a PC may meet (or satisfy) or meets (or satisfies) a threshold comparison condition. A proximity of a PV to a PC may meet (or satisfy) a threshold comparison condition when the proximity of the PV to the PC may reach (e.g., be at) or reaches (e.g., is at) a threshold, may cross or crosses a threshold, may exceed or exceeds a threshold, and/or may be less than or is less than a threshold. For example, a WTRU may determine that (or when) the proximity of a PV to a PC may reach (e.g., be at) or reaches (e.g., is at) a threshold, may cross or crosses a threshold, may exceed or exceeds a threshold, and/or may be less than or is less than a threshold.

A WTRU may consider a condition to be met or satisfied when the WTRU determines that the condition will be met or satisfied, for example in or for the time unit or TTI for which the determination is made. A WTRU may determine that a condition is met or satisfied when the WTRU determines that the condition will be met or satisfied, for example in or for the time unit or TTI for which the determination is made.

In the embodiments described herein, a WTRU may trigger or provide a report or indication, e.g., to an eNB, for example when (e.g., when a WTRU determines that) the proximity of a PV to a PC may meet (or satisfy) a threshold comparison condition. A report or indication may indicate that the proximity of a PV to a PC met (or satisfied) a threshold or threshold comparison criteria. A WTRU may trigger or provide a report or indication, e.g., to an eNB, to indicate that the proximity of a PV to a PC may meet or meets, may satisfy or satisfies, may have met or has met and/or may have satisfied or has satisfied a threshold comparison condition.

In the embodiments described herein, a report or indication may include (e.g., may include a value or representative indication of the value of) at least one of a PV, a PC, and/or a proximity of a PV to a PC. A report or indication may identify or may include an identification of which threshold comparison condition was met (or satisfied).

Alternatively or additionally in the embodiments described herein, a WTRU may determine that (or when) a proximity condition is or may be met or satisfied (e.g., that or when a proximity condition is or may be true). A proximity condition may be at least one of (or a result of whether at least one of) the following:

A PV is or may be near a PC or threshold;

A PV is or may be at a PC or threshold (e.g., a first threshold) or exceeds or may exceed a PC or threshold (e.g., a first threshold);

A PV is or may be less than a PC or threshold (e.g., a second threshold);

A PV is or may be within a threshold (e.g., a first threshold) of a PC;

A PV is or may be more than a threshold (e.g., a second threshold) from a PC;

A PV changes or may change from not being within a threshold (e.g., a first threshold) of a PC to being within a threshold (e.g., a first threshold) of a PC;

A PV changes or may change from not being more than threshold (e.g., a second threshold) from a PC to being more than a threshold (e.g., a second threshold) from a PC;

A PV changes or may change from being within a first threshold of a PC to being more than a second threshold from a PC;

A PV changes or may change from being more than a second threshold from a PC to being within a first threshold of a PC;

A proximity (e.g., of a PV to a PC) changes or may change from being more than a threshold (e.g., a first threshold) to being less than a threshold (e.g., a first threshold);

A proximity changes or may change from being less than a threshold (e.g., a second threshold) to being more than a threshold (e.g., a second threshold);

A proximity changes or may change from being less than a first threshold to being more than a second threshold; and/or A proximity changes or may change from being more than a second threshold to being less than a first threshold of a PC. A WTRU may trigger or provide a report or indication, e.g., to an eNB, when a proximity condition may be met or satisfied (e.g., when the WTRU determines that a proximity condition may be met or satisfied).

In the embodiments described herein, one or more thresholds may be provided and/or used. One or more thresholds may be configured, e.g., by the eNB. A WTRU may receive one or more thresholds (e.g., configuration of one or more thresholds), for example from an eNB. A first threshold may be used for a first threshold comparison (e.g., for a first threshold comparison condition). A second threshold may be used for a second threshold comparison (e.g., for a second threshold comparison condition). A first threshold and a second threshold may be the same or different.

A threshold may be adjusted by one or more offsets or hysteresis values, for example when using a threshold to determine that or when a threshold comparison condition may be met or satisfied. The use of an offset or hysteresis value may, for example, prevent triggering reports due to small changes in a PV or proximity when the PV or proximity may be near the threshold.

One or more thresholds may be associated with and/or may correspond to a TTI such as a TTI that may be configured or supported. One or more thresholds may be configured for or with a TTI.

In some examples and embodiments, "less than" may be replaced by "less than or equal to," "within" may be replaced by "at or within," "more than" may be replaced by "at least," and/or "greater than" may be replaced by "greater than or equal to," and still be consistent with the embodiments described herein.

The term "threshold" may be used to represent a threshold value. A threshold may be configured and/or represented in one or a multiple (e.g., integer number) of time units. A time unit may, for example be at least one of a symbol, a time sample, an integer number of symbols, a fraction of a symbol (e.g., ½ symbol or ¼ symbol), an integer number of time samples, a TA step, or an integer number of TA steps. A TA step may, for example be 16 time samples. A threshold may be configured and/or represented in time such as in microseconds and/or nanoseconds.

For example, a WTRU may determine that (or when) a PV (e.g., TA, Rx-Tx time difference, a processing time, or a timeline) is or may be at a threshold, exceeds or may exceed a threshold, or is or may be below a threshold. The determination and/or the PV may be for a TTI such as a current TTI or an upcoming TTI. The determination and/or the PV may be for an UL TTI or UL transmission (e.g., an upcoming or current UL TTI or an upcoming or current UL transmission). The UL transmission may be for an upcoming or current TTI. The threshold and/or the PV may be based on processing time that may be associated with the UL transmission. The threshold and/or the PV may be based on reception, processing, and/or processing time that may be associated with one or more DL TTIs that may be prior to the UL transmission. The WTRU may trigger and/or provide a report or indication, e.g., to an eNB, that may indicate that the PV may be at a threshold, may exceed a threshold, or may be below a threshold.

In another example, a WTRU may determine that (or when) a proximity of a PV (e.g. a TA, a Rx-Tx time difference, a processing time, or a timeline) to a PC (e.g., a maximum TA capability or limit, a maximum Rx-Tx time difference capability or limit, a processing time capability or limit, or a timeline capability or limit) is or may be at a threshold, exceeds or may exceed a threshold, or is or may be below a threshold.

The determination, the proximity, the PV, and/or the PC may be for a TTI such as the current TTI or an upcoming TTI. The determination, the proximity, the PV, and/or the PC may be for an UL TTI or UL transmission (e.g., an upcoming or current UL TTI or UL transmission). The UL transmission may be for an upcoming or current TTI. The threshold(s) (e.g., that may be associated with the proximity, the PV and/or the PC), the PV, and/or the PC may be based on the processing time that may be associated with the UL transmission. The threshold(s) (e.g., that may be associated with the proximity, the PV and/or the PC), the PV and/or the PC may be based on reception, processing, and/or processing time that may be associated with one or more DL TTIs that may be prior to the UL transmission. The WTRU may trigger and/or provide a report or indication, e.g., to an eNB, that may indicate that the proximity of a PV to a PC is or may be at a threshold, exceeds or may exceed a threshold, or is or may be below a threshold.

A report may be or may include one or more indications. In some examples and embodiments report and indication may be used interchangeably. In the embodiments described herein, a report or indication may be or may include at least one of:

A PV (e.g., a current or recent PV), for example a current or recent (e.g., most recent) applied TA, a current or recent (e.g., most recent) Rx-Tx time difference (e.g., measured Rx-Tx time difference), or a current or recent (e.g., most recent) processing time;

A PC (e.g., a current, recent, or most recent PC that may be determined by the WTRU);

A proximity (or headroom) of a PV to a PC, for example that may correspond to the time (e.g., TTI) of the report or indication or the time to which the report or indication may correspond;

A proximity (or headroom) of a PV to a PC, for example a current or recent (e.g., most recent) proximity value that may be determined using a current or recent (e.g., most recent) PV and/or PC;

An indication that a (e.g., which) threshold may be or may have been exceeded;

An indication of a (e.g., which) threshold comparison condition may have been met (or satisfied);

An indication of a (e.g., which) proximity condition may have been met (or satisfied);

A TTI or TTI length, for example the TTI or TTI length for which a threshold may have been exceeded and/or for which a comparison condition or proximity condition may have been met (or satisfied); and/or An indication of the condition that may have triggered the report or indication (e.g., triggered the transmission of the report or indication).

A PV, a PC, a proximity (e.g., of a PV to a PC), a headroom, and/or a TTI that may be included in a report may be represented in one or a multiple (e.g., integer number) of time units. A PV, a PC, a proximity (e.g., of a PV to a PC), a headroom, a TTI, a time unit, and/or a multiple of time units may be quantized and/or may be represented by a value in or an index into a set, list, or table of values, for example, when determined, configured, provided, and/or reported.

In the embodiments described herein, a report or indication may be provided via at least one of RRC, MAC, or physical layer signaling. A WTRU may provide and/or an eNB may receive a report or indication via at least one of RRC, MAC, or physical layer signaling. The report or indication may be provided and/or received in at least one of a/an: RRC signaling; MAC control element (e.g., MAC-CE); PUCCH; UL control information (UCI); and/or scheduling request (SR). The report or indication may be provided and/or received using a physical layer channel that may correspond to the TTI (e.g., UL TTI) for which the report or indication may be provided. The report or indication may be provided and/or received using a physical layer channel that may correspond to another TTI (e.g., UL TTI), for example a longer TTI such as a normal or regular TTI.

A report or indication, such as those described herein, may be referred to as a proximity report or a headroom report. A headroom report may be a timing headroom report or an UL timing headroom report. A proximity report may be periodic, aperiodic, and/or event triggered. The periodicity of the report may be configured, e.g., by an eNB. A proximity report may be triggered and/or transmitted, e.g., in a TTI, when one or more of the following events occur or may occur:

Configuration (e.g., reception of a configuration) to use a TTI (e.g., a short TTI (sTTI));

Configuration or reconfiguration (e.g., reception of configuration or reconfiguration) of a TTI or TTI length (e.g., a short TTI or TTI length);

A periodic timer expires or has expired;

A threshold comparison condition is or may be met;

A proximity condition is or may be met;

An aperiodic request for a proximity report is received (e.g., in a DL control channel and/or DCI or DCI format);

A PV, PC, or proximity changes by more than a threshold, for example since the last proximity report was transmitted;

A threshold comparison condition has changed (e.g., met vs. not met), for example since the last proximity report was transmitted; and/or A proximity condition has changed (e.g., met vs. not met), for example since the last proximity report was transmitted.

A WTRU may trigger and/or transmit a proximity report when one or more of the events identified above occur or may occur (e.g., when the WTRU determines that one or more of those events may occur.) For example, a WTRU may trigger and/or transmit a proximity report when the WTRU receives configuration to use a TTI (e.g., sTTI) and/or when the WTRU receives configuration or reconfiguration of a TTI or TTI length (e.g., a sTTI or TTI length). In another example, a WTRU may trigger and/or transmit a proximity report in response to reception of an aperiodic request for a proximity report.

A trigger and/or transmission may be conditioned based on whether a timer (e.g., a prohibit timer such as a proximity prohibit timer) has expired. A timer may be started (e.g., set to a 0 or to a maximum or expiry value that may be configured) when a proximity report is transmitted. A timer may be used, for example, to avoid excessive proximity reports. A timer may be adjusted (e.g., incremented or decremented) in a TTI (e.g., each TTI). A timer, e.g., a timer that is decremented, may expire when the value may be 0. A timer, e.g., a timer that is incremented, may expire when the value reaches or exceeds a maximum or expiry value that may be configured. The maximum or expiry value may be a prohibit timer maximum or expiry value.

A trigger and/or transmission may be conditioned based on whether there is room in the UL transmission (e.g., PUSCH) for a proximity report (e.g., that may be transmitted in a MAC-CE).

A WTRU may evaluate and/or determine whether an event may occur in or for a TTI (e.g., each TTI). A WTRU may trigger and/or transmit a proximity report in a TTI, for example the TTI in or for which the WTRU determines that the event occurs or may occur. A TTI may be a DL TTI or an UL TTI. A TTI may be a sTTI or a long or regular TTI.

Figure 5:
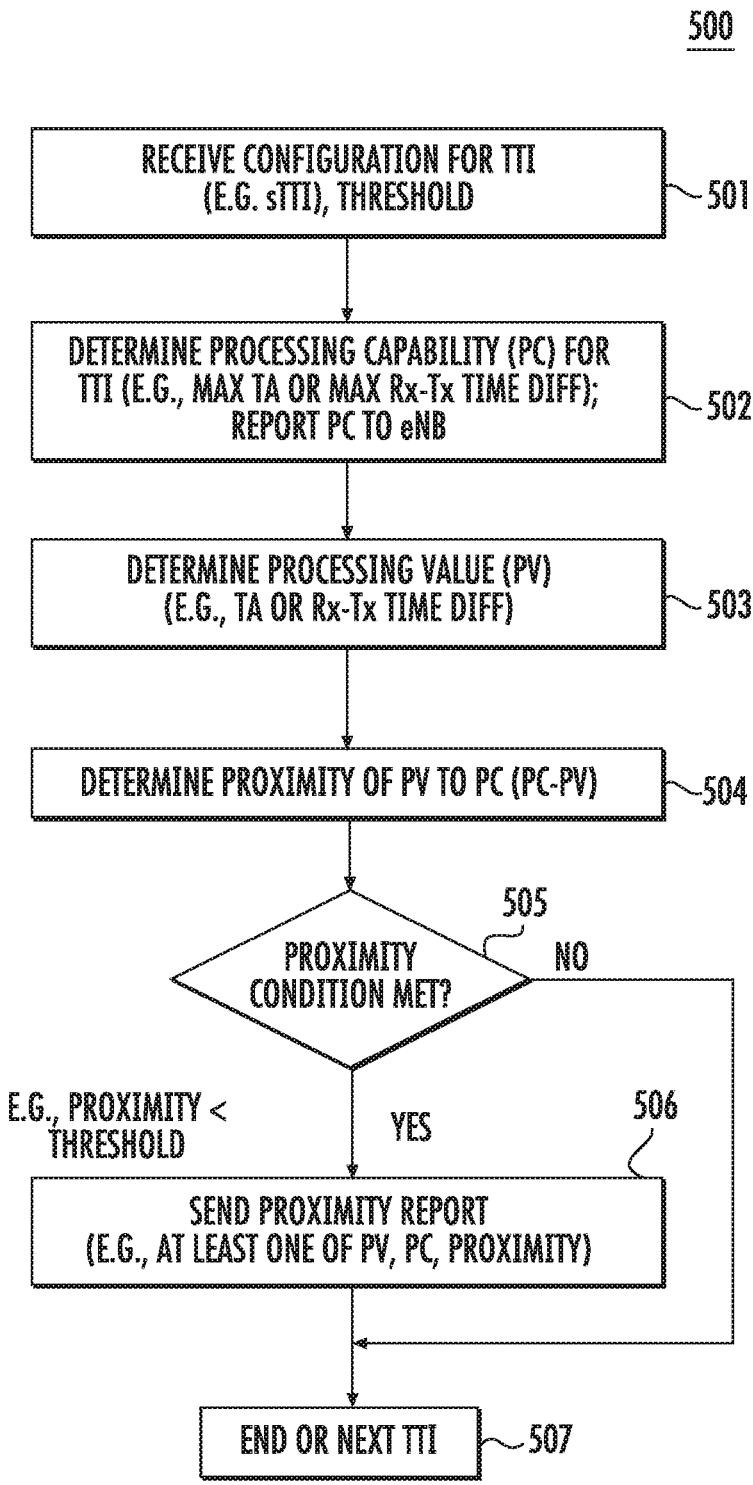
FIG. 5 is an example of proximity reporting.

FIG. 5 is an example of a proximity reporting method 500 in accordance with one example, which may be used in combination with any of the examples described herein. While each step of the method 500 in FIG. 5 is shown and described separately, multiple steps may be executed in a different order than what is shown, in parallel with each other, or concurrently with each other. The method of FIG. 5 is performed by a WTRU for exemplary purposes, but it may also be performed by any node operating in a wireless communications system such as an, eNB, AP, or base station. In the example of FIG. 5, a WTRU may receive a TTI configuration, which for example may be a sTTI configuration 501. The configuration may also include a threshold (e.g., a proximity reporting threshold). The threshold may be defined in accordance with the examples above. The WTRU may determine a PC of the WTRU for the TTI or sTTI (e.g., for the TTI or sTTI configuration) 502, which may include for example a maximum (max) TA, max Rx-Tx time difference, or any of the parameters defined in the examples above. The WTRU may also report the PC to the eNB in accordance with the examples above. The PC may be determined based on at least one processing criteria (e.g., criterion). Processing criteria may include but are not limited to: a number of symbols in the TTI or TTI length that may be used and/or configured (e.g., in or according to the TTI configuration), sTTI length (in UL and/or DL), a TBS of a PDSCH (for which HARQ feedback may be sent in the UL sTTI), a channel type (PUSCH or PUCCH) on which HARQ may be sent in the UL sTTI, a time between DL TTI or DL sTTI for the PDCCH and UL TTI or UL sTTI for PUCCH or PUSCH, or any of the other processing criteria defined in the examples above. The WTRU may determine a PV 503, which may include for example a TA or Rx-Tx time difference, or any of the parameters defined in the examples above. The WTRU may determine the proximity of the PV to PC 504 (e.g., determine PC-PV). The WTRU may determine whether a proximity condition is met 505, which may for example include determining whether the proximity of PV to PC is less than the proximity reporting threshold. If the proximity condition is met, the WTRU may send a proximity report 506, which may include reporting the PV, PC, and/or proximity based on the satisfaction of the proximity condition. The WTRU may perform the process of FIG. 5 for a TTI or sTTI (e.g., an UL TTI or sTTI). The WTRU may end (e.g., the process) or may repeat (e.g., the process) for another TTI or sTTI such as the next TTI or sTTI 507 following sending (or determining to send) the proximity report or if the proximity condition is not met. When repeating, the WTRU may, for example, begin from 503, for example when the configuration (e.g., TTI configuration) is unchanged. The WTRU may begin from 501 when a new configuration may be received.

Figure 6:
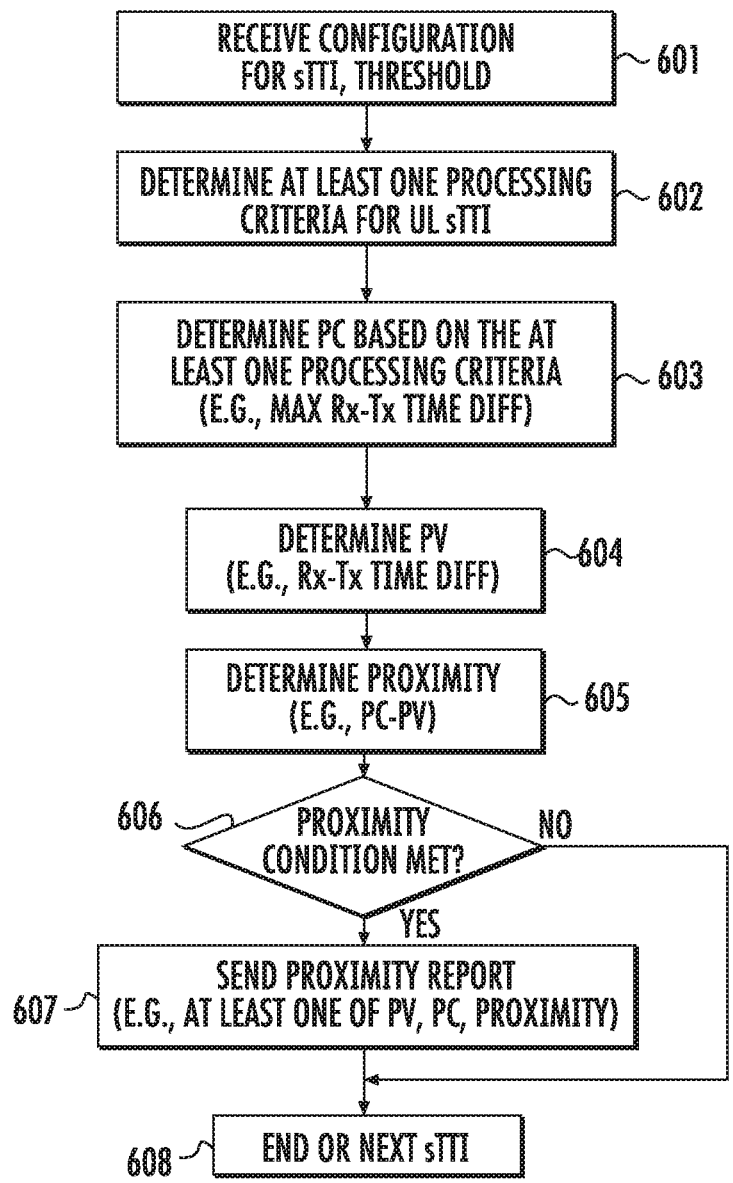
FIG. 6 is another example of proximity reporting.

FIG. 6 is another example of a proximity reporting method 600 in accordance with another example, which may be used in combination with any of the examples described herein. While each step of the method 600 in FIG. 6 is shown and described separately, multiple steps may be executed in a different order than what is shown, in parallel with each other, or concurrently with each other. The method of FIG. 6 is performed by a WTRU for exemplary purposes, but it may also be performed by any node operating in a wireless communications system such as an, eNB, AP, or base station. In the example of FIG. 6, the WTRU may receive an sTTI configuration 601. The configuration may also include a threshold (e.g., a proximity reporting threshold). The threshold may be defined in accordance with the examples above. The WTRU may determine at least one processing criteria (e.g., criterion) for the UL sTTI 602. Processing criteria may include but are not limited to: a number of symbols in the TTI or TTI length that may be used and/or configured (e.g., in or according to the TTI configuration), sTTI length (in UL and/or DL), a TBS of a PDSCH (for which HARQ feedback may be sent in the UL sTTI), a channel type (PUSCH or PUCCH) on which HARQ may be sent in the UL sTTI, a time between DL sTTI for the PDCCH and UL sTTI for PUCCH or PUSCH, or any of the other processing criteria defined in the examples above. The WTRU may determine a PC of the WTRU 603 based on the at least one processing criteria, which may include for example a max TA or max Rx-Tx time difference. The WTRU may also report the PC to the eNB. The WTRU may determine a PV 604, which may include for example a TA or Rx-Tx time difference. The WTRU may determine the proximity of the PV to PC 605 (e.g., determine PC-PV). The WTRU may determine whether a proximity condition is met 606, which may for example include determining whether the proximity of PV to PC is less than the proximity reporting threshold. If the proximity condition is met, the WTRU may send a proximity report 607, which may include reporting the PV, PC, and/or proximity based on the satisfaction of the proximity condition. The WTRU may perform the process of FIG. 6 for a TTI or sTTI (e.g., an UL TTI or sTTI). The WTRU may end (e.g., the process) or may repeat (e.g., the process) for another TTI or sTTI such as the next TTI or sTTI 608 following sending (or determining to send) the proximity report or if the proximity condition is not met. When repeating, the WTRU may, for example, begin from 604, for example when the configuration (e.g., TTI configuration) is unchanged. The WTRU may begin from 601 when a new configuration may be received.

As described above, a WTRU may determine that (or when) a condition may be met or satisfied (e.g., that or when a condition may be true). For example, a condition may be at least one of: a threshold comparison condition, a proximity condition, an exception condition, a transmission suspension condition, and/or the like. A WTRU may determine that or when a condition may be met in a TTI (e.g., each TTI) or for a (e.g., at least one) TTI (e.g., each TTI). The terms met and satisfied may be used interchangeably in the examples and embodiments described herein.

In accordance with another embodiment, a WTRU may not perform at least some UL transmissions, for example when an exception condition is or may be met (e.g., when a WTRU determines that an exception condition is or may be met). An exception condition may be or may include at least one of (or a result of whether at least one of) but is not limited to the following:

A PV reaches or may reach or exceeds or may exceed a threshold or a PC (e.g., a PC that may be a maximum value or maximum PV that may be supported, allowed, and/or used);

A proximity of a PV to a PC indicates (e.g., by its value) that a PV may reach or exceed a threshold or a PC;

A PC is or may be reached or exceeded;

A PV is not or may not be supported;

A PV is or may be below a threshold or PC (e.g., a PC that may be a minimum value or minimum PV that may be supported, allowed, and/or used); and/or A proximity of a PV to a PC indicates (e.g., by its value) that a PV may be below a threshold or a PC.

A transmission suspension condition may be or may include at least one of (or a result of whether at least one of) the following:

A timer (e.g., TAT) may be stopped, expired, or considered expired, for example a timer that may be associated with at least some UL transmissions;

A timer (e.g., TAT) may be stopped, expired, or considered expired, for example a timer that may be associated with (e.g., may be for) a TTI (e.g., TTI length) and/or a TAG;

At least some UL transmissions may be stopped or suspended, for example one or more UL transmissions that may associated with (e.g., may be for) a TTI (e.g., TTI length) and/or a TAG; and/or A flag or indicator (e.g., a transmission stop or suspend flag or indicator) may indicate that at least some UL transmissions may not be performed, for example one or more UL transmissions that may be associated with (e.g., may be for) a TTI (e.g., TTI length) and/or a TAG.

A WTRU may not perform some UL transmissions when a transmission suspension condition is or may be met (e.g., when a WTRU determines that a transmission suspension condition is or may be met).

For example, a WTRU may determine and/or may evaluate whether a PV reaches or may reach a threshold or PC, whether a PV exceeds or may exceed a threshold or PC (e.g., a PC that may be a maximum) and/or whether a PV has gone or may go below a threshold or a PC (e.g., a PC that may be a minimum). This determination may be made based on an evaluation by the WTRU. A WTRU may determine that or when a PV may reach (e.g., may be at or may equal), may exceed, or may go below a threshold or a PC, for example based on an evaluation. A WTRU may make an evaluation and/or determination in, or for, at least one TTI. A WTRU may, for example, make an evaluation and/or determination for an UL TTI. A WTRU may, for example, make an evaluation and/or determination in a DL TTI that may be associated with an UL TTI. The TTI (e.g., UL TTI) may be the TTI to which the PV and/or PC may apply.

In another example, a WTRU may make an evaluation and/or determination for a first PV when the WTRU receives or makes an adjustment to the first PV or to a second PV. For example, a WTRU may make an evaluation for a TA (e.g., an applied TA) when the WTRU receives an adjustment to a TA (e.g., an applied TA) or when the WTRU adjusts a TA (e.g., an applied TA). A WTRU may make an evaluation for an Rx-Tx time difference when the WTRU receives an adjustment to a TA (e.g., applied TA) or when the WTRU adjusts a TA (e.g., an applied TA).

In another example, a WTRU may make an evaluation and/or determination for a PV when the PV changes, for example due to a received and/or applied adjustment to the PV or to timing (e.g., receive and/or transmit timing) that may impact the PV.

In another example, a WTRU may determine the proximity of a PV to a PC. A WTRU may use the proximity of the PV to the PC (e.g., determined proximity) to determine and/or evaluate whether, that, or when a PV reaches, exceeds, or goes below a PC. The WTRU may determine that (or when) a PV reaches a PC when a determined proximity is 0. A WTRU may determine that (or when) a PV exceeds a PC when the determined proximity (e.g., PC-PV) is negative. A WTRU may determine that (or when) a PV goes below (e.g., does not exceed) a PC when a determined proximity (e.g., PC-PV) is positive. Alternatively, a WTRU may determine that (or when) a PV exceeds a PC when the determined proximity (e.g., PV-PC) is positive. A WTRU may determine that (or when) a PV may be below (e.g., may not exceed) a PC when a determined proximity (e.g., PV-PC) may be negative.

A WTRU may do one or more of the following, for example when the WTRU determines that a condition is met:

Set a PV to a specific value (e.g., use a specific value for a PV) such as a threshold value, a configured value, a maximum value, or a PC, for example cap a PV at a maximum value that is supported;

Stop, suspend, and/or not perform at least some UL transmissions, for example for a TTI, a TTI length, and/or a combination of UL and DL TTI lengths;

Perform at least some UL transmissions, for example for another TTI, another TTI length, and/or another combination of UL and DL TTI lengths;

Modify at least some UL transmissions, for example for a TTI, a TTI length, and/or a combination of UL and DL TTI lengths;

Stop a timer (e.g., a TAT), for example a timer (e.g., a TAT) that may be related to a TAG, a TTI length, and/or a combination of UL and DL TTI lengths;

Consider a timer (e.g., a TAT) to have expired, for example a timer (e.g., TAT) that may be related to a TAG, a TTI length, and/or a combination of UL and DL TTI lengths;

Perform one or more timer (e.g., TAT) expiry actions, transmission stop actions, and/or transmission suspend actions;

Set (or clear) a flag or indicator, for example to indicate that a PV may have reached or exceeded a PC; set (or clear) a flag or indicator, for example to indicate that a PV may be below a PC;

Set (or clear) a flag or indicator (e.g., a transmission stop or suspend flag or indicator), for example to indicate that at least some UL transmissions may not be performed, for example some UL transmissions for a TTI, a TTI length, and/or a combination of UL and DL TTI lengths;

Send an error message and/or a proximity report, for example using a transmission with a TTI length (e.g., a longer TTI length) for which a condition may not be met; and/or Send an error message or indication and/or a proximity report, for example using a PRACH transmission and/or random access procedure.

In some of the examples and embodiments described herein, the terms set and clear may be substituted for each other and still be consistent with this disclosure.

In another embodiment, a WTRU may set a PV to a specific value such as a threshold value, a configured value, a maximum value, or a PC, for example when a condition is or may be met.

For a condition that may be met for a PV, a threshold and/or a PC, a WTRU may, for example, set the PV to the threshold or to the PC. For example, when a TA (e.g., applied TA) may reach or reaches or may exceed or exceeds a maximum TA, the WTRU may set or limit the TA (e.g., applied TA) to the maximum TA.

For a condition that may be met for a PV, a threshold and/or a PC, a WTRU may, for example, set another PV to a specific value. For example, when a Rx-Tx time difference may reach or reaches or may exceed or exceeds a maximum Rx-Tx time difference, the WTRU may set a TA (e.g., applied TA) to a maximum TA. Setting the TA to a maximum TA may keep the Rx-Tx time difference from exceeding the maximum Rx-Tx time difference.

For example, a WTRU may set a PV to a specific value on a condition that the WTRU may be configured to use a first TTI (e.g., a short TTI) and, for example to not use a second TTI (for example a normal TTI) for at least some transmissions such as at least some UL transmissions (e.g., PUSCH and/or PUCCH transmissions).

For example, a WTRU may use a first value (e.g., a specific or capped value) for a PV in one time unit (e.g., subframe), for example in a time unit in which the WTRU may transmit using a first TTI (e.g., a short TTI) and a second value (e.g., a regular or uncapped value) for a PV in another time unit (e.g., subframe) in which a WTRU may transmit using a second TTI (e.g., a normal TTI). For example, a WTRU may apply a TA that has been capped in one subframe, for example in a subframe in which the WTRU may transmit using a first TTI (e.g., a short TTI) and a TA that has not been capped in another subframe in which a WTRU may transmit using a second TTI (e.g., a normal TTI).

For example, a WTRU may determine that a condition may be or is met when the WTRU determines that a TA (e.g. applied TA) may exceed or exceeds a maximum TA (applied TA), when the WTRU determines that a Rx-Tx time difference may exceed or exceeds a maximum Rx-Tx time difference, and/or when the WTRU determines that a processing time may exceed or exceeds a maximum processing time.

In another example, a WTRU may determine that a condition may be or is met when the WTRU determines that a processing time (e.g., minimum processing time) that may, for example be needed or used, may exceed or exceeds an available processing time (or an available processing time may be or is less than a processing time or a minimum processing time that the WTRU may need or may use).

In another example, a WTRU may determine that a condition may be met when the WTRU may determine that a TTI (e.g., TTI length) that may be determined, indicated, requested, and/or configured may be lower than a minimum TTI that the WTRU may support. The TTI may be a sTTI. The TTI may be an UL TTI and/or a DL TTI. The minimum TTI may be associated with a channel (e.g., PUSCH and/or PUCCH). The minimum TTI may be associated with a combination of an UL TTI and a DL TTI.

In another embodiment, a WTRU may stop, suspend, or not perform at least some UL transmissions (e.g., current, upcoming, and/or future UL transmissions), for example one or more UL transmissions for a TTI and/or TTI length to which a PV and/or a PC may apply, for example when a condition is or may be met.

For example, for a condition that may be or is met for a PV and/or a PC, a WTRU may not perform at least some UL transmissions for a TTI and/or TTI length to which the PV and/or the PC may apply. The UL transmissions may include at least one of PUSCH, PUCCH, and/or SRS. The WTRU may not perform at least some UL transmissions beginning with the current, upcoming, or next UL TTI, for example the current, upcoming, or next UL TTI (e.g., sTTI) to which the PV and/or the PC may apply.

When a PV and/or PC applies to a first TTI and/or a first TTI length and/or a condition is or may be met for a first TTI or a first TTI length, a WTRU may perform at least some UL transmissions, for example one or more UL transmissions for a second TTI and/or a second TTI length for which the PV and/or PC may not apply and/or for which the condition is not or may not be met.

In the embodiments described herein, a WTRU may do at least one of the following when a condition is or may be met (e.g. when the WTRU determines that a condition is or may be met):

Stop some (e.g., all) UL transmissions (e.g., of a TTI length such as any TTI length), for example until a resume condition is or may be met;

Stop some (e.g., all) UL transmissions for a (e.g., any) TTI length (or DL/UL TTI length combination) for which the condition is or may be met, for example until a resume condition is or may be met;

Stop some (e.g., all) UL transmissions for a (e.g., any) TTI length (or DL/UL TTI length combination) for a TTI in which (or for which) the condition is or may be met (e.g., in or for which it may be determined that the condition may be met);

Stop some (e.g., all) UL transmissions for a (e.g., any) channel for which the condition is or may be met, for example until a resume condition is or may be met; and/or Stop some (e.g., all) UL transmissions for a (e.g., any) channel for a TTI in which (or for which) the condition is or may be met (e.g., in or for which it may be determined that the condition may be met).

Stopping and/or suspending a transmission may also be referred to herein as skipping a transmission, dropping a transmission, not performing a transmission, and/or not transmitting. Accordingly, in some examples and embodiments described herein, stop, suspend, skip, drop, not perform, and not transmit may be used interchangeably. Performing a transmission and transmitting may be used interchangeably. In some examples and embodiments, not transmitting and transmitting with a power of 0 may be used interchangeably.

An UL transmission that may be stopped may include a current, upcoming, or future UL transmission. A WTRU may stop some UL transmissions, for example based on a condition being met, in and/or beginning with a TTI (e.g., a first TTI) for which the WTRU determines that the condition may be met.

A WTRU may perform or resume some UL transmissions, for example based on a resume condition being met (e.g., based on the WTRU determining a resume condition is met).

A resume condition may be met (e.g., a WTRU may determine a resume condition to be met) when (e.g., when the WTRU determines that) at least one of the following may occur or may have occurred:

Receipt of a TA command that may have been provided in a random access response, for example following a PRACH preamble transmission by the WTRU where the PRACH transmission is triggered or initiated by a PDCCH order;

Receipt of a TA command that results in a condition (e.g., a condition that may have been met) no longer being met;

Start or restart of a timer (e.g., a TAT) such as an associated timer (e.g., TAT); and/or Clearing (or resetting) of a flag or indicator (e.g., a transmission stop or suspend flag or indicator). For example, a resume condition may be met when a flag or indicator (e.g., a transmission stop or suspend flag or indicator) is cleared or reset.

A WTRU may perform or resume some UL transmissions, for example one or more UL transmissions that it may have stopped based on a condition being met, when the condition is not (or is no longer) met.

Alternatively or additionally, a WTRU may perform or not perform one or more UL transmissions based on the TTI length of the UL transmission. A WTRU may perform or not perform one or more UL transmissions based on the TTI length of the UL transmission and the TTI length of an associated DL transmission. An associated DL transmission for an UL HARQ transmission (e.g., on a PUCCH or a PUSCH) may be the TTI length of a PDSCH for which the HARQ may be transmitted. An associated DL transmission for an UL data transmission (e.g., on a PUSCH) may be the TTI length associated with a DL control channel (e.g., PDCCH) that may provide a grant, allocation, or scheduling information for the UL data channel.

For example, a WTRU may be configured with and/or operating with a first TTI length and/or a second TTI length. The WTRU may stop transmissions (e.g., in the UL) that may use a first TTI length (e.g., sTTI) for which a condition is or may be met. The WTRU may perform transmissions or continue performing transmissions (e.g., in the UL) that may use a second TTI length (e.g., nTTI), for example a TTI length for which the condition may not be met or for which the condition or evaluation of the condition may not apply.

A WTRU may not transmit (e.g., in the UL) using a TTI length (e.g., sTTI) in at least one TTI (e.g., sTTI), for example, in and/or beginning with a current or next TTI, for example a current or next DL or UL TTI (e.g., sTTI) to which the condition and/or the PV or PC of the condition, may apply.

Figure 7:
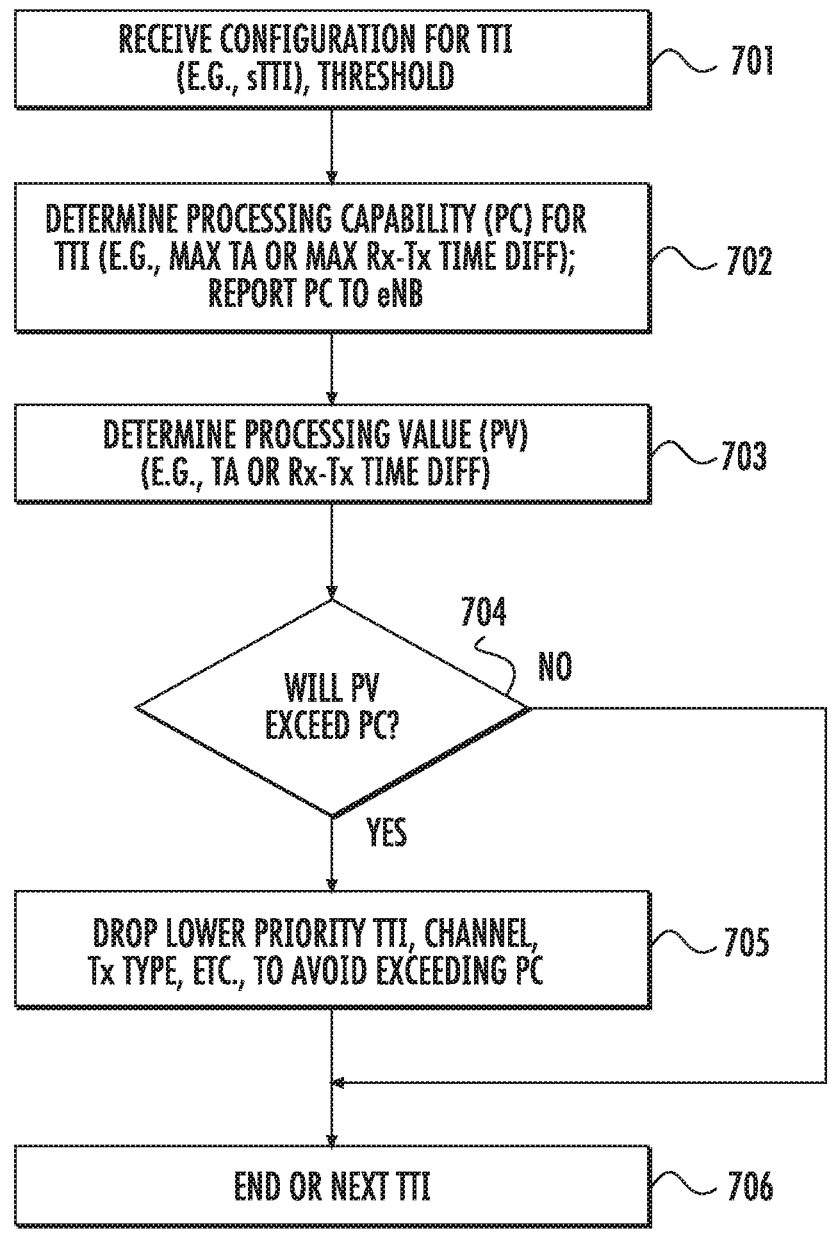
FIG. 7 is an example of modifying UL transmissions when a condition is met.

FIG. 7 is an example method for modifying UL transmissions when a condition is or may be met 700 in accordance with another example, which may be used in combination with any of the examples described herein. An UL transmission may be modified (e.g., by a WTRU), for example when a condition such as an exception condition is or may be met. For example, a WTRU may delay an UL transmission (e.g., by a number of time samples or symbols). In another example, a WTRU may not transmit a portion of the UL transmission, which may include dropping or skipping transmission of a number of time samples or symbols at the beginning of the transmission. While each step of the method 700 in FIG. 7 is shown and described separately, multiple steps may be executed in a different order than what is shown, in parallel with each other, or concurrently with each other. The method of FIG. 7 is performed by a WTRU for exemplary purposes, but it may also be performed by any node operating in a wireless communications system such as an, eNB, AP, or base station.

In the example of FIG. 7, a WTRU may receive a TTI configuration, which for example may be a sTTI configuration 701. The configuration may also include a threshold. The threshold may be defined in accordance with the examples above. The WTRU may determine a PC of the WTRU for the TTI or sTTI configuration 702, which may include for example a max TA, max Rx-Tx time difference, or any of the parameters defined in the examples above. The WTRU may also report the PC to the eNB in accordance with the examples above. The PC may be based on at least one processing criteria. Processing criteria may include but are not limited to: a number of symbols in the TTI or TTI length that may be used and/or configured (e.g., in or according to the TTI configuration), sTTI length (in UL and/or DL), a TBS of a PDSCH (for which HARQ feedback may be sent in the UL sTTI), a channel type (PUSCH or PUCCH) on which HARQ may be sent in the UL sTTI, a time between DL TTI or DL sTTI for the PDCCH and UL TTI or UL sTTI for PUCCH or PUSCH, or any of the other processing criteria defined in the examples above. The WTRU may determine a PV 703, which may include for example a TA or Rx-Tx time difference, or any of the parameters defined in the examples above. The WTRU may then determine whether the PV exceeds or will exceed the PC 704. In the example of FIG. 7, if the PV exceeds or will exceed the PC, the WTRU may modify its transmission in order to avoid exceeding the PC 705. For example, the WTRU may make modifications including but not limited to dropping (i.e., not transmitting) a lower priority TTI, channel, or transmission type. If the PV exceeds, may exceed, or will exceed the PC, the WTRU may also drop the first x time samples or symbols of an UL transmission that may, for example correspond to at least PV-PC (e.g., PV-PC quantized to the next highest unit time for which transmission may be skipped). The WTRU may perform the process of FIG. 7 for a TTI or sTTI (e.g., an UL TTI or sTTI). The WTRU may end (e.g., the process) or may repeat (e.g., the process) for another TTI or sTTI such as the next TTI or sTTI 706 following modifying (or determining to modify) its transmission in order to avoid exceeding the PC or if the PV does not exceed or will not exceed the PC. When repeating, the WTRU may, for example, begin from 703, for example when the configuration (e.g., TTI configuration) is unchanged. The WTRU may begin from 701 when a new configuration may be received.

In another example, if a WTRU is able to support a maximum TA or Rx-Tx time difference of x time samples and the current TA or Rx-Tx time difference is y time samples (e.g., y>x), the WTRU may not transmit the first z time samples or the first q symbols of an UL transmission, which may be an UL transmission for which at least one of the TA, the maximum TA, the Rx-Tx time difference and/or the maximum Rx-Tx time difference may apply. The UL transmission may be a transmission with a TTI (e.g., sTTI) for which the exception condition (e.g., for the TA or Rx-Tx time difference) is or may be met. The WTRU may not transmit the first z time samples or the first q symbols, for example when y is greater than x.

The value of z may be y-x. Alternatively, the value of z may be y-x plus an offset (e.g., +1 or -1). The offset may be fixed or configured. The value of q may the next highest integer number of symbols that may correspond to z. For example, the value of q may be CEIL[z/(number of time samples per symbol)].

A ceiling function, CELL [x], may map a number (e.g., a real number) x to the smallest following integer. For example, CEIL[2.2] may be 3.

In an additional example, a processing time that a WTRU may need or may use may be y (e.g., PV may equal y). An available processing time may be x (e.g., PC may equal x). The WTRU may not transmit the first z (e.g., y-x) time samples or the first q symbols of an UL transmission, for example an UL transmission for which the processing time and/or the available processing time applies. The WTRU may not transmit the first z time samples or the first q symbols, for example when y is greater than x. The UL transmission may be a transmission with a TTI (e.g., sTTI) for which the exception condition (e.g., PV>PC) applies or may apply.

A timer (e.g., TAT), a flag, and/or an indicator may be configured, provided, and/or used. A flag may be a transmission stop or suspend flag. An indicator may be a transmission stop or suspend indicator.

A timer (e.g., a TAT) may be associated with and/or configured for a TTI (e.g., a TTI length), for example a TTI (e.g., TTI length) of a TAG. A TAT may be used as a non-limiting example of a timer.

A flag or indicator, for example a stop or suspend transmission flag or indicator, may be associated with and/or configured for a TTI (e.g., a TTI length), for example a TTI (e.g., TTI length) of a TAG. An indicator may, for example, be or include a flag. A flag or indicator may be set to indicate to stop or suspend at least some UL transmissions, e.g., UL transmissions that may be associated with a TTI (e.g., TTI length).

A WTRU or MAC entity (e.g., of a WTRU) may have and/or maintain at least one timer and/or at least one indicator that may be associated with and/or configured for a TTI (e.g., TTI length), for example a TTI (e.g., TTI length) of a TAG.

A WTRU may stop a timer or consider it as expired, for example when a condition may be met. A WTRU may stop a timer or consider it as expired, for example according to one or more examples and/or embodiments described herein.

Timer (e.g., TAT) expiry actions, transmission stop actions, and/or transmission suspend actions may be or may include at least one of the following:

Flush one or more (e.g., all) HARQ buffers for one or more TTIs or TTI lengths (e.g., all TTIs or TTI lengths) for example for which a condition may be met or for which a timer (e.g., TAT) may have expired;

Flush one or more (e.g., all) HARQ buffers for one or more TTIs or TTI lengths (e.g., all TTIs or TTI lengths except nTTI) for example for the TAG for which a condition is or may be met or for which a timer (e.g., TAT) may have expired;

Release and/or notify RRC to release PUCCH (e.g., sPUCCH) and/or SRS (e.g., sSRS), for one or more TTIs or TTI lengths (e.g., all TTIs or TTI lengths) for example for which a condition may be met or for which a timer (e.g., TAT) may have expired;

Release and/or notify RRC to release PUCCH (e.g., sPUCCH) and/or SRS (e.g., sSRS), for one or more TTIs or TTI lengths (e.g., all TTIs or TTI lengths except nTTI) for example for the TAG for which a condition may be met or for which a timer (e.g., TAT) may have expired;

Clear one or more (e.g., any) of the DL assignments and/or one or more (e.g., any) UL grants where the assignments and/or grants may be for one or more TTIs or TTI lengths (e.g., all TTIs or TTI lengths) for example for which a condition may be met or for which a timer (e.g., TAT) may have expired; and/or Clear one or more (e.g., any) of the DL assignments and/or one or more (e.g., any) UL grants where the assignments and/or grants may be for one or more TTIs or TTI lengths (e.g., all TTIs or TTI lengths except nTTI) for example for the TAG for which a condition may be met or for which a timer (e.g., TAT) may have expired.

One or more HARQ buffers may be associated with and/or used for a TTI or TTI length. One or more parts of a HARQ buffer may be associated with and/or used for a TTI and/or TTI length.

Flushing a HARQ buffer for a TTI or TTI length may comprise at least one of:

Flushing a HARQ buffer (e.g., a whole HARQ buffer) that may be associated with and/or used for the TTI or TTI length;

Flushing a HARQ buffer (e.g., whole HARQ buffer) that may be at least partially associated with and/or used for the TTI or TTI length; and/or Flushing a part of a HARQ buffer that may be associated with and/or used for a TTI or TTI length.

A condition may be associated with (e.g., may be for) at least one of a TTI, a TTI length, a TAG, a channel, and/or a MAC entity.

A WTRU may do at least one of the following, for example when a condition is or may be met (e.g., when a WTRU determines that a condition is or may be met), for example for a TTI or TTI length:

Not perform at least some UL transmissions, for example some (e.g., all) UL transmissions for at least a TTI or TTI length for which the condition may be met;

Not perform at least some UL transmissions, for example transmissions of one or more UL channels for which the condition may be met;

Not perform at least some UL transmissions, for example for a TTI or TTI length that may be shorter than the TTI or TTI length for which the condition may be met;

Perform at least some UL transmissions, for example for a (e.g., another) TTI or TTI length for which the condition may not be met or may not apply; and/or Perform at least some UL transmissions, for example for a (e.g., another) TTI or TTI length that may be a nTTI and/or another TTI that may be longer than the TTI or TTI length for which the condition may be met.

A WTRU may make the determination as to whether a condition is or may be met on a TAG basis (e.g., separately for a TAG or for each TAG). A WTRU may stop one or more UL transmissions on a TAG for which a condition is or may be met. A WTRU may not stop one or more (e.g., all) UL transmissions on a TAG for which a condition may not be met or may not apply.

An UL transmission may be a current, upcoming or future UL transmission. For example, a WTRU may determine whether an UL transmission may be suspended for a TTI length, e.g., sTTI, for example for a TAG. An UL transmission may be suspended, for example when an associated timer is or may be expired or an associated suspend transmission indicator is or may be set. A WTRU may make the determination in or for a TTI (e.g., an upcoming UL sTTI). If the WTRU determines that an UL transmission is suspended, the WTRU may skip the UL transmission for that sTTI for that TAG.

In another example, a WTRU may perform some (e.g., all) UL transmissions of a TTI or TTI length when a timer that is associated with the TTI or TTI length is not stopped (e.g., when the timer may be running).

Figure 8:
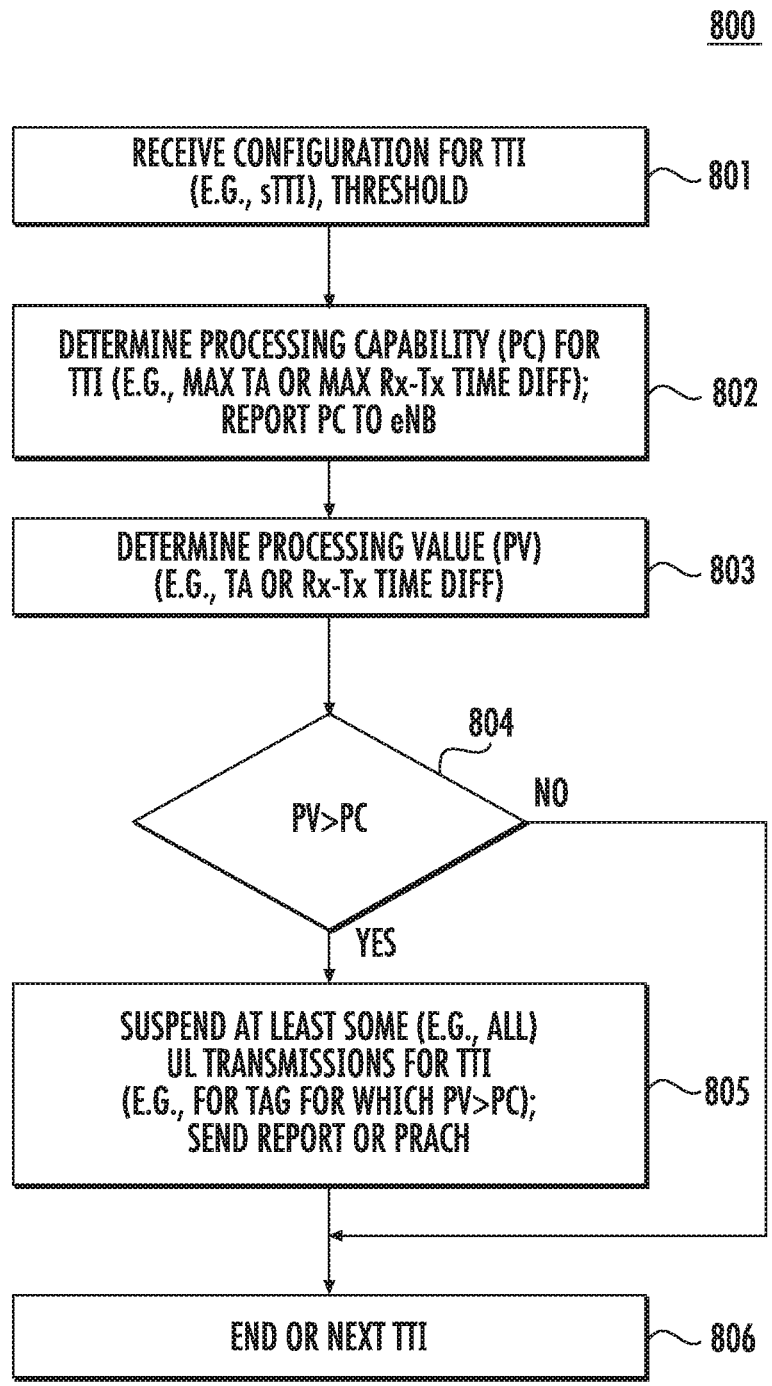
FIG. 8 is an example of transmission suspension.

FIG. 8 is an example of a transmission suspension method 800 in accordance with another example, which may be used in combination with any of the examples described herein. While each step of the method 800 in FIG. 8 is shown and described separately, multiple steps may be executed in a different order than what is shown, in parallel with each other, or concurrently with each other. The method of FIG. 8 is performed by a WTRU for exemplary purposes, but it may also be performed by any node operating in a wireless communications system such as an, eNB, AP, or base station. In the example of FIG. 8, a WTRU may receive a TTI configuration, which for example may be a sTTI configuration 801. The configuration may also include a threshold. The threshold may be defined in accordance with the examples above. The WTRU may determine a PC of the WTRU for the TTI or sTTI configuration 802, which may include for example a max TA, max Rx-Tx time difference, or any of the parameters defined in the examples above. The WTRU may also report the PC to the eNB in accordance with the examples above. The PC may be based on at least one processing criteria. Processing criteria may include but are not limited to: a number of symbols in the TTI or TTI length that may be used and/or configured (e.g., in or according to the TTI configuration), sTTI length (in UL and/or DL), a TBS of a PDSCH (for which HARQ feedback may be sent in the UL sTTI), a channel type (PUSCH or PUCCH) on which HARQ may be sent in the UL sTTI, a time between DL TTI or DL sTTI for the PDCCH and UL TTI or UL sTTI for PUCCH or PUSCH, or any of the other processing criteria defined in the examples above. The WTRU may determine a PV 803, which may include for example a TA or Rx-Tx time difference, or any of the parameters defined in the examples above. The WTRU may then determine whether the PV is greater than the PC 804. If the PV is greater than the PC, the WTRU may suspend at least some or all of the UL transmission for the TTI or sTTI 805. For example, this suspension of UL transmission may apply to a TAG in which the PV is greater than the PC. If the PV is greater than the PC, the WTRU may send a report or initiate a random access procedure by transmitting a preamble on the PRACH.

The WTRU may perform the process of FIG. 8 for a TTI or sTTI (e.g., an UL TTI or sTTI). The WTRU may end (e.g., the process) or may repeat (e.g., the process) for another TTI or sTTI such as the next TTI or sTTI 806 following suspending (or determining to suspend) at least some or all of the UL transmission for the TTI or sTTI or if the PV is not greater than the PC. When repeating, the WTRU may, for example, begin from 803, for example when the configuration (e.g., TTI configuration) is unchanged. The WTRU may begin from 801 when a new configuration may be received.

Figure 9:
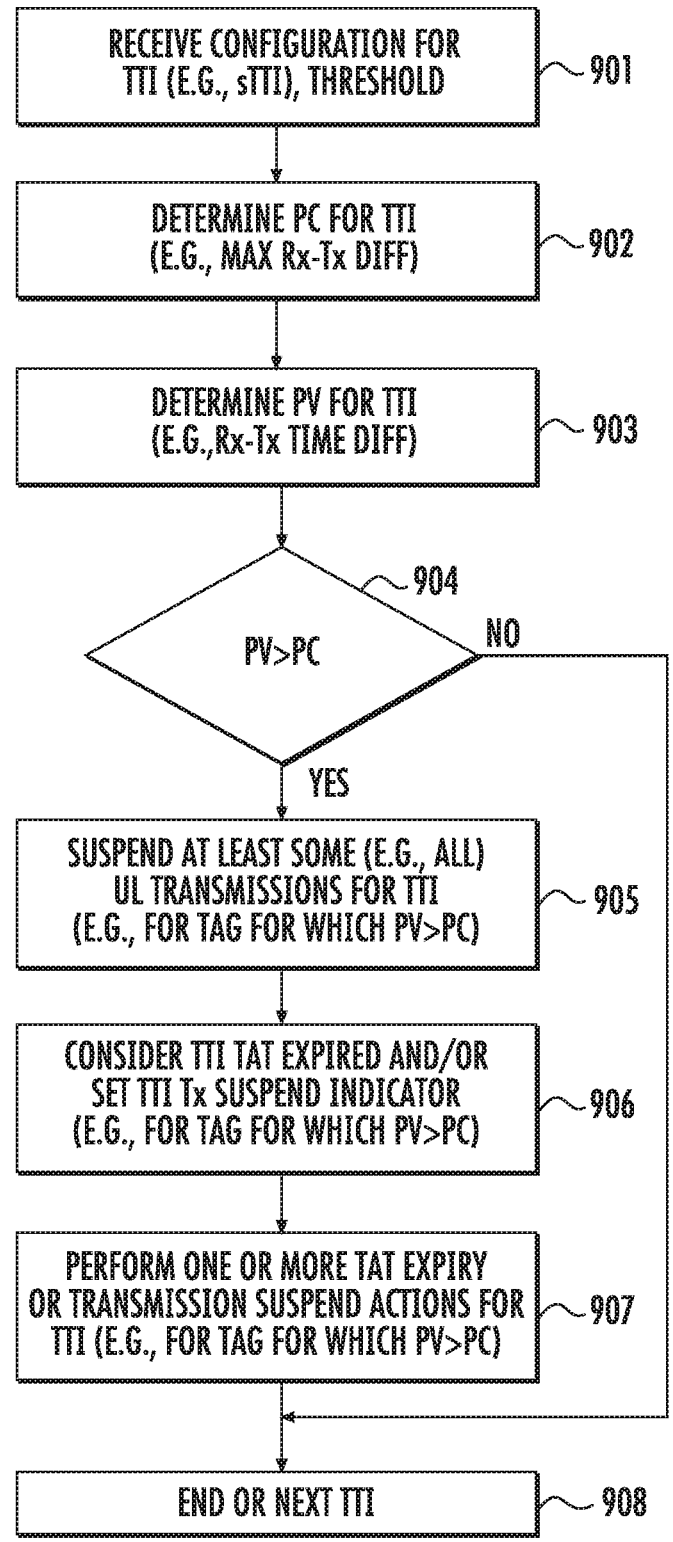
FIG. 9 is another example of transmission suspension.

FIG. 9 is another example of transmission suspension method 900 in accordance with another example, which may be used in combination with any of the examples described herein. While each step of the method 900 in FIG. 9 is shown and described separately, multiple steps may be executed in a different order than what is shown, in parallel with each other, or concurrently with each other. The method of FIG. 9 is performed by a WTRU for exemplary purposes, but it may also be performed by any node operating in a wireless communications system such as an, eNB, AP, or base station.

In the example of FIG. 9, a WTRU may receive a TTI configuration, which for example may be a sTTI configuration 901. The configuration may also include a threshold. The threshold may be defined in accordance with the examples above. The WTRU may determine a PC of the WTRU for the TTI or sTTI configuration 902, which may include for example a max TA, max Rx-Tx time difference, or any of the parameters defined in the examples above. The PC may be based on at least one processing criteria. Processing criteria may include but are not limited to: sTTI length (in UL and/or DL), a TBS of a PDSCH (for which HARQ feedback may be sent in the UL sTTI), a channel type (PUSCH or PUCCH) on which HARQ may be sent in the UL sTTI, a time between DL TTI or DL sTTI for the PDCCH and UL TTI or UL sTTI for PUCCH or PUSCH, or any of the other processing criteria defined in the examples above. The WTRU may determine a PV 903, which may include for example a TA or Rx-Tx time difference, or any of the parameters defined in the examples above. The WTRU may then determine whether the PV is greater than the PC 904. If the PV is greater than the PC, the WTRU may suspend at least some or all of the UL transmission for the TTI or sTTI 905. For example, this suspension of UL transmission may apply to a TAG in which the PV is greater than the PC. The WTRU may also consider the TTI or sTTI TAT to have expired and/or set the TTI or sTTI transmission suspension indicator 906. For example, this considering the TTI or sTTI TAT to having expired and/or setting the TTI or sTTI transmission suspension indicator may apply to a TAG in which the PV is greater than the PC. The WTRU may also perform one or more TAT expiry or transmission suspension actions for the TTI or sTTI 907. For example, this performance of one or more TAT expiry or transmission suspension actions for the TTI or sTTI may apply to a TAG in which the PV is greater than the PC. The WTRU may perform the process of FIG. 9 for a TTI or sTTI (e.g., an UL TTI or sTTI). The WTRU may end (e.g., the process) or may repeat (e.g., the process) for another TTI or sTTI such as the next TTI or sTTI 908 following the above steps or if the PV is not greater than the PC. When repeating, the WTRU may, for example, begin from 903, for example when the configuration (e.g., TTI configuration) is unchanged. The WTRU may begin from 901 when a new configuration may be received.

Figure 10:
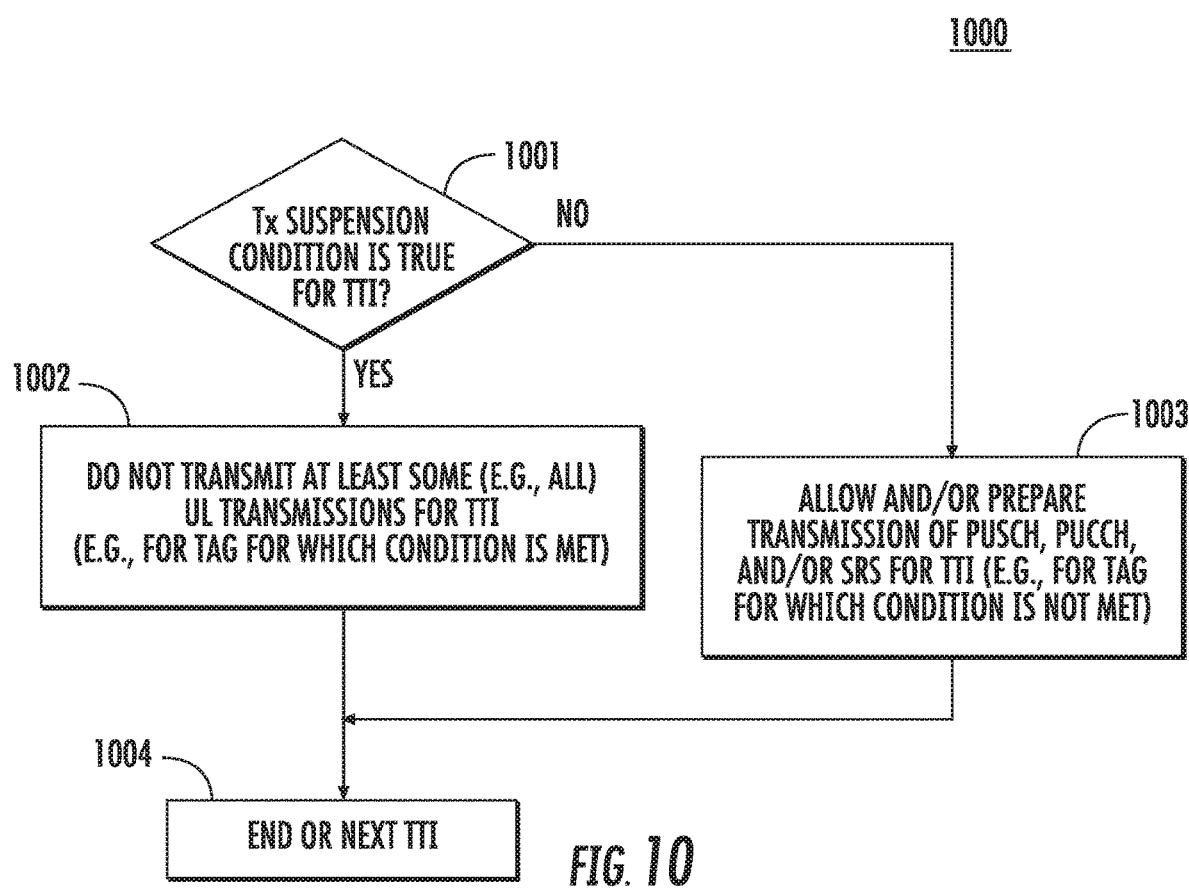
FIG. 10 is example of transmission suspension when a suspension condition is met.

FIG. 10 is another example of transmission suspension method when a suspension condition is met 1000 in accordance with another example, which may be used in combination with any of the examples described herein. While each step of the method 1000 in FIG. 10 is shown and described separately, multiple steps may be executed in a different order than what is shown, in parallel with each other, or concurrently with each other. The method of FIG. 10 is performed by a WTRU for exemplary purposes, but it may also be performed by any node operating in a wireless communications system such as an, eNB, AP, or base station.

A suspension condition may be true when at least one of the following is true for a TAG: at least one UL transmission (e.g. all UL transmissions) is/are suspended (e.g., for a TTI), a TAT (e.g., for a TTI) is expired, and a transmission suspend indicator (e.g., for the TTI) is set. Referring to the example of FIG. 10, the WTRU may determine whether a suspension condition is true for the TTI 1001. If a suspension condition is true for the TTI or sTTI, the WTRU may not transmit at least some or all of the UL transmissions for the TTI or sTTI 1002. For example, dropping transmissions may apply to a TAG in which the suspension condition is true. If a suspension condition is not true for the TTI or sTTI, the WTRU may allow transmission to proceed and prepare transmission of the PUSCH, PUCCH, and/or SRS for the TTI or sTTI 1003. For example, allowing transmission to proceed and preparing transmission may apply to a TAG in which the suspension condition is not true. The WTRU may end the process or repeat the process for another TTI or sTTI, e.g., the next TTI or sTTI 1004.

In another embodiment, a WTRU may prioritize one transmission over another, for example to avoid a condition being met, such as: a first TTI (e.g., TTI length) may be prioritized over a second TTI (e.g., TTI length); a transmission of a first TTI (e.g., TTI length) may be prioritized over a transmission of a second TTI (e.g., TTI length); a first channel (e.g., PUCCH) type may be prioritized over a second channel type (e.g., PUSCH); a transmission of a first channel type (e.g., PUCCH) may be prioritized over a transmission of a second channel type (e.g., PUSCH); and/or a first transmission type (e.g., UCI such as HARQ feedback) may be prioritized over a second transmission type (e.g., of data).

For example, a transmission with a first TTI length may be transmitted and a transmission with second TTI length may be dropped (e.g., not performed) when a first TTI length may have priority over a second TTI length.

In another example, a transmission with a first TTI length may be transmitted and a transmission with a second TTI length may be dropped, for example when the transmission with the first TTI length and/or preparation for transmission with the first TTI length may result in a condition (e.g., an exception condition) being met, where the condition may be met for a second TTI length. Alternatively, the transmission with the second TTI length may be transmitted and the transmission with the first TTI length may be dropped, for example when the second TTI length may have priority over the first TTI length. A first TTI length may, for example be a nTTI and a second TTI length may be a sTTI, or vice versa.

In another example, a WTRU may transmit or may be scheduled to transmit UCI (e.g., HARQ feedback) and data. The WTRU may transmit or may be scheduled to transmit the UCI and data on a PUSCH (e.g., the same PUSCH). If processing of the PUSCH may result in a condition (e.g., an exception condition) being met, the WTRU may drop (e.g., not transmit) the data and/or may not transmit the PUSCH. The WTRU may transmit the UCI on a PUCCH.

In another example, a WTRU may receive a PDSCH for which the WTRU may generate UCI (e.g., HARQ feedback). The WTRU may transmit the UCI on a PUCCH or PUSCH. A WTRU may receive an allocation or scheduling grant for a PUSCH before the time that the WTRU may transmit the UCI and/or HARQ feedback. The PUSCH may, e.g., according to the allocation or grant, be transmitted before, at least partially overlapping with, or after the time that the WTRU may transmit the UCI. The WTRU may not prepare the UL data for the PUSCH transmission and/or may not transmit the PUSCH, for example when the preparation and/or PUSCH transmission results in a condition (e.g., an exception condition) being met. The condition may be met for the TTI in which the UCI may be transmitted or for the TTI length of the UCI transmission. The WTRU may transmit the UCI on a PUCCH, for example when there may not be a PUSCH transmission (e.g., for data) when the UCI and/or HARQ feedback may be transmitted.

A WTRU may provide an indication, e.g., in a PUCCH transmission, to indicate that a PUSCH may be dropped and/or that a condition (e.g., exception condition) may be met, for example for a TTI of the PUCCH transmission.

One or more processing capabilities may or may not be applicable in a cell. For example, in a small cell, a short TA may be used for a cell edge WTRU. A maximum TA may be supportable by some (e.g., all) WTRUs in a small cell.

An eNB may provide an indication to indicate whether a PC (e.g., one or more PCs) applies in a cell. The indication may be provided in signaling such as RRC signaling and/or broadcast signaling. The indication may be provided in system information (e.g., in a SIB). An eNB may provide the indication to at least one WTRU. An eNB may configure a WTRU with an indication, for example an indication as to whether a PC may apply.

A WTRU may receive an indication that may be provided and/or configured, e.g., by an eNB. A WTRU may consider, determine, and or use at least one of PV, PC, proximity, and/or proximity reporting, when a PC applies. A WTRU may use an indication that may be provided and/or configured (e.g., by an eNB) to determine when a PC applies.

As described above, a TA command in subframe n may be applied at subframe n+x, where for example x may be 6. For a TTI length that is equal to a subframe, the TA command may be applied at (e.g., to the start of) subframe n+x.

For a TA command that may be received in a TTI with a shorter length than 1 subframe, the TA command may (e.g., still) be considered to be received in a subframe. It may, for example, be beneficial to apply the TA at a subframe rate (e.g., on subframe boundaries) to allow the use of mixed TTI lengths in order to not have an impact on TA application.

For a TA command that may be received (e.g., by a WTRU) in a TTI or TTI length (e.g., any TTI or TTI length) within subframe n, the TA command may be applied at subframe n+y, for example at or to the start of subframe n+y. The value of y may be x (e.g., 6).

The value of y may be a function of at least one of: a TTI length (e.g., DL and/or UL TTI length) that may be configured and/or used; a PC, for example a maximum TA value in a cell; and/or a distance (e.g., time delta) between a DL TTI and an UL TTI.

The value of y may be fixed or configured, for example for a TTI length or a set of TTI lengths. The value of y may be indicated with the TA command.

For example, y may be a fixed or configured value (e.g., 3) for TTI lengths less than or equal to a time period such as a timeslot (e.g., 0.5 ms).

A WTRU may receive more than one TA command that may be applied at subframe z, for example according to the n+y application rule. A WTRU may consider the receipt of multiple TA commands for the same subframe to be an error. A WTRU may apply one of the received TA commands, for example an earliest received TA command or a latest received TA command. A WTRU may apply one of the received TA commands, for example according to the WTRU implementation. A WTRU may apply a combination (e.g., a sum) of the received TA commands.

For example, subframe n+y may be the first subframe at least k TTIs after subframe n. In another example, subframe n+y may be the first subframe at least k TTIs after the TTI in which the TA command is received. The value of k may be a function of at least one of: a TTI length (e.g., DL and/or UL TTI length) that may be configured and/or used; a PC, for example a maximum TA value in a cell; and/or a distance between a DL TTI and an UL TTI.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU) for using a processing capability (PC), the method comprising:
receiving transmission time interval (TTI) configuration information;
transmitting a WTRU capabilities message, including information indicating the PC of the WTRU, wherein the PC is associated with a minimum processing time and a maximum timing advance (TA) value, wherein the maximum TA value is associated with the minimum processing time, and wherein the minimum processing time is represented as a number of time units;
receiving a TA value, wherein the TA value is less than or equal to the maximum TA value; and
transmitting user data using a TTI length and the TA value, wherein the TTI length is based on the received TTI configuration information.

2. The method of claim 1, wherein a time unit is at least one of a symbol, a TTI, a time sample, and a set of time samples.

3. The method of claim 1, wherein the TTI configuration information indicates at least a number of symbols for the TTI length.

4. The method of claim 1, wherein the TTI configuration information indicates at least a number of timeslots for the TTI length.

5. The method of claim 1, wherein the TTI configuration information indicates at least a subcarrier spacing for the TTI length.

6. The method of claim 1, wherein the information indicating the PC is transmitted as part of a set of information indicating PCs.

7. The method of claim 1, wherein the number of time units is a number between a first time unit and a second time unit, wherein user data is transmitted during the first time unit.

8. The method of claim 7, wherein hybrid-automatic repeat requests (HARQ) feedback is received during the second time unit.

9. A wireless transmit/receive unit (WTRU) configured to use a processing capability (PC), the WTRU comprising:
a receiver configured to receive transmission time interval (TTI) configuration information;
a transmitter configured to transmit a WTRU capabilities message, including information indicating the PC of the WTRU, wherein the PC is associated with a minimum processing time and a maximum timing advance (TA) value, wherein the maximum TA value is associated with the minimum processing time, and wherein the minimum processing time is represented as a number of time units;
the receiver configured to receive a TA value, wherein the TA value is less than or equal to the maximum TA value; and
the transmitter configured to transmit user data using a TTI length and the TA value, wherein the TTI length is based on the received TTI configuration information.

10. The WTRU of claim 9, wherein a time unit is at least one of a symbol, a TTI, a time sample, and a set of time samples.

11. The WTRU of claim 9, wherein the TTI configuration information indicates at least a number of symbols for the TTI length.

12. The WTRU of claim 9, wherein the TTI configuration information indicates at least a number of timeslots for the TTI length.

13. The WTRU of claim 9, wherein the TTI configuration information indicates at least a subcarrier spacing for the TTI length.

14. The WTRU of claim 9, wherein the information indicating the PC is transmitted as part of a set of information indicating PCs.

15. The WTRU of claim 9, wherein the number of time units is a number between a first time unit and a second time unit, wherein user data is transmitted during the first time unit.

16. The WTRU of claim 15, wherein hybrid-automatic repeat requests (HARQ) feedback is received during the second time unit.

17. A method for use in a base station for using a processing capability (PC), the method comprising:
transmitting a transmission time interval (TTI) configuration information;
receiving a wireless transmit/receive unit (WTRU) capabilities message including determined information indicating the PC of a WTRU, wherein the PC is associated with a minimum processing time and a maximum timing advance (TA) value, wherein the maximum TA value is associated with the minimum processing time, and wherein the minimum processing time is represented as a number of time units;
transmitting a TA value, wherein the TA value is less than or equal to the maximum TA value; and
receiving user data using a TTI length and the TA value, wherein the TTI length is based on the transmitted TTI configuration information.

18. The method of claim 17, wherein a time unit is at least one of a symbol, a TTI, a time sample, and a set of time samples.

19. The method of claim 17, the TTI configuration information indicates at least one of a number of symbols, a number of timeslots and a subcarrier spacing for the TTI length.

20. The method of claim 17, wherein the information indicating the PC is received as part of a set of information indicating PCs.

21. The method of claim 17, wherein the number of time units is a number between a first time unit and a second time unit, wherein user data is received during the first time unit.

22. The method of claim 21, wherein hybrid-automatic repeat requests (HARQ) feedback is transmitted during the second time unit.

* * * * *